US011062118B2

(12) United States Patent
Ross

(10) Patent No.: US 11,062,118 B2
(45) Date of Patent: Jul. 13, 2021

(54) MODEL-BASED DIGITAL FINGERPRINTING

(71) Applicant: ALITHEON, INC., Bellevue, WA (US)

(72) Inventor: David Justin Ross, Bellevue, WA (US)

(73) Assignee: ALITHEON, INC., Bellevue, WA (US)

(*) Notice: Subject to any disclaimer, the term of this patent is extended or adjusted under 35 U.S.C. 154(b) by 137 days.

(21) Appl. No.: 16/045,642

(22) Filed: Jul. 25, 2018

(65) Prior Publication Data

US 2019/0034694 A1    Jan. 31, 2019

Related U.S. Application Data

(60) Provisional application No. 62/536,496, filed on Jul. 25, 2017.

(51) Int. Cl.
| | |
|---|---|
| *G06K 9/00* | (2006.01) |
| *G06T 17/00* | (2006.01) |
| *G06T 7/55* | (2017.01) |
| *G06F 16/583* | (2019.01) |

(52) U.S. Cl.
CPC ....... *G06K 9/00067* (2013.01); *G06F 16/583* (2019.01); *G06F 16/5838* (2019.01); *G06K 9/00013* (2013.01); *G06K 9/00577* (2013.01); *G06T 7/55* (2017.01); *G06T 17/00* (2013.01); *G06T 2207/10028* (2013.01)

(58) Field of Classification Search
CPC ....... G06T 7/55; G06T 17/00; G06F 16/5838; G06F 16/583; G06K 9/00577; G06K 9/00013
See application file for complete search history.

(56) References Cited

U.S. PATENT DOCUMENTS

| | | | |
|---|---|---|---|
| 4,218,674 A | 8/1980 | Broscow et al. | |
| 4,423,415 A | 12/1983 | Goldman | |
| 4,677,435 A | 6/1987 | Causse D'Agraives et al. | |
| 4,700,400 A | 10/1987 | Ross | |

(Continued)

FOREIGN PATENT DOCUMENTS

| | | |
|---|---|---|
| DE | 102006005927 | 8/2007 |
| EP | 0439669 | 8/1991 |

(Continued)

OTHER PUBLICATIONS

Drew, M. S., et al., "Sharpening from Shadows: Sensor Transforms for Removing Shadows using a Single Image," *Color and Imaging Conference*, vol. 5, Society for Imaging Science and Technology, 2009, pp. 267-271.

(Continued)

*Primary Examiner* — Edward Park
(74) *Attorney, Agent, or Firm* — Cozen O'Connor

(57) ABSTRACT

Digital fingerprinting systems, devices, and methods are arranged to acquire image data of a portion of a surface of a physical object, and further arranged to construct a model of the portion of the surface of the physical object from the image data. A digital fingerprint based on the model is extracted, and the physical object is inducted into a reference database system by storing a record in the reference database system that includes the digital fingerprint of the model.

16 Claims, 6 Drawing Sheets

(56) References Cited

U.S. PATENT DOCUMENTS

| | | |
|---|---|---|
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,596 B2 | 6/2016 | Ross et al. |
| 9,443,298 B2 | 9/2016 | Ross et al. |
| 9,558,463 B2 | 1/2017 | Ross et al. |
| 10,199,886 B2 | 2/2019 | Li et al. |
| 10,540,664 B2 | 1/2020 | Ross et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0179931 A1 | 9/2003 | Sun |
| 2003/0182018 A1 | 9/2003 | Snapp |
| 2003/0208298 A1 | 11/2003 | Edmonds |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2005/0007776 A1 | 1/2005 | Monk et al. |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0282900 A1 | 12/2007 | Owens et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |

(56) References Cited

U.S. PATENT DOCUMENTS

| | | |
|---|---|---|
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng et al. |
| 2013/0214164 A1 | 8/2013 | Zhang et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0201094 A1 | 7/2014 | Herrington et al. |
| 2014/0184843 A1 | 9/2014 | Campbell et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1* | 1/2019 | Liu ................. G16H 50/20 |
| 2019/0102873 A1 | 4/2019 | Wang et al. |
| 2019/0228174 A1 | 7/2019 | Withrow et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |

FOREIGN PATENT DOCUMENTS

| | | |
|---|---|---|
| EP | 0759596 | 2/1997 |
| EP | 1016548 | 7/2000 |
| EP | 1719070 | 4/2009 |
| EP | 2107506 | 10/2009 |
| EP | 2166493 | 3/2010 |
| EP | 2195621 | 11/2013 |
| EP | 2866193 | 4/2015 |
| EP | 2 869 240 A2 | 5/2015 |
| EP | 2 869 241 A2 | 5/2015 |
| EP | 2257909 | 5/2015 |
| EP | 3208744 A1 | 8/2017 |
| EP | 3 249 581 A1 | 11/2017 |
| EP | 3435287 A2 | 1/2019 |
| GB | 2097979 | 11/1982 |
| GB | 2482127 | 1/2012 |
| JP | 61-234481 | 10/1986 |
| JP | 2007-213148 | 8/2007 |
| KR | 20120009654 A | 2/2012 |
| WO | WO 2005/086616 | 9/2005 |
| WO | WO 2006/038114 | 4/2006 |
| WO | WO 2007/028799 | 3/2007 |
| WO | WO 2007/031176 | 3/2007 |
| WO | WO 2007/071788 | 6/2007 |
| WO | WO 2007/090437 | 8/2007 |
| WO | WO 2007/144598 | 12/2007 |
| WO | WO 2009/030853 | 3/2009 |
| WO | WO 2009/089126 | 7/2009 |
| WO | WO 2009/115611 | 9/2009 |
| WO | WO 2010/018464 | 2/2010 |
| WO | WO 2012/145842 | 11/2012 |
| WO | WO 2013/126221 | 8/2013 |
| WO | WO 2013/173408 | 11/2013 |
| WO | WO 2015/004434 | 1/2015 |
| WO | WO 2016/081831 | 5/2016 |
| WO | WO 2016/081831 A1 * | 5/2016 |

OTHER PUBLICATIONS

Maddern, W., et al., "Illumination invariant imaging: Applications in Robust Vision-based Localisation, Mapping and Classification for Autonomous Vehicles," Proceedings of the Visual Place Recognition in Changing Environments Workshop, IEEE International Conference on Robotics and Automation (ICRA), Hong Kong, China, 2014.

Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hiibner, S. Tseng, J., Barking, J.: (Boston: Springer), pp. 57-77 (21 pages).

Farid, "Digital Image Forensics," Dartmouth CS 89/189, Sprint 2013, 199 pages.

Huang et al., "A Novel Binarization Algorithm for Ballistic Imaging Systems," 3rd International Congress on Image and Signal Processing, Yantai, China, Oct. 16-18, 2010, pp. 1287-1291.

(56) References Cited

OTHER PUBLICATIONS

Huang et al., "An Online Ballistics Imaging System for Firearm Identification," 2nd International Conference on Signal Processing Systems, Dalian, China, Jul. 5-7, 2010, vol. 2, pp. 68-72.

Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.

Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 2 pages.

Smith, "Fireball: A Forensic Ballistic Imaging System: Proceedings of the 31st Annual International Carnahan Conference on Security Technology," Canberra, Australia, Oct. 15-17, 1997, pp. 64-70.

United States Postal Service Publication 28 "Postal Addressing Standards", dated Jul. 2008; text plus Appendix A only; 55 pages.

Boa et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Di Paola et al., "An Autonomous Mobile Robotic System for Surveillance of Indoor Environments," International Journal of Advanced Robotic Systems 7(1): 19-26, 2010.

Fischler et al., "Random Sample Consensus: A Paradigm for Model Fitting with Applications to Image Analysis and Automated Cartography," Communication of the ACM 24(6); 381-395, 1981.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Matsumoto et al., "Nano-artifact metrics based on random collapse of resist," Scientific Reports 4:6142, 2014 (5 pages).

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Shi et al., "Smart Cameras: Fundamentals and Classification," Chapter 2, Belbachir (ed.), Smart Cameras, Springer, New York, New York, USA 2010, pp. 19-34.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

Veena et al., "Automatic Theft Security System (Smart Surveillance Camera)," Computer Science & Information Technology 3:75-87, 2013.

United States Postal Services, NCOALink® Systems, dated May 27, 2009, URL=http://ribbs.usps.gov/ncoalink/ncoalink_print.htm, download date Jun. 23, 2010, 3 pages.

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages).

Entrupy.com Website History, Wayback Machine; https://web.archive.org/web/20160330060808/https://www.entrupy.com/; Mar. 30, 2016 (Year: 2016), 2 pages.

Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.

Mistry et al., "Comparison of Feature Detection and Matching Approaches: SIFT and SURF," Global Research and Development Journal for Engineering, vol. 2, Issue 4, Mar. 2017, 8 pages.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

United States Postal Service, "NCOALink® Systems," https://web.archive.org/web/20100724142456/http://www.usps.com/ncsc/addressservices/moveupdate/changeaddress.htm; download date Jun. 23, 2010, 2 pages.

* cited by examiner

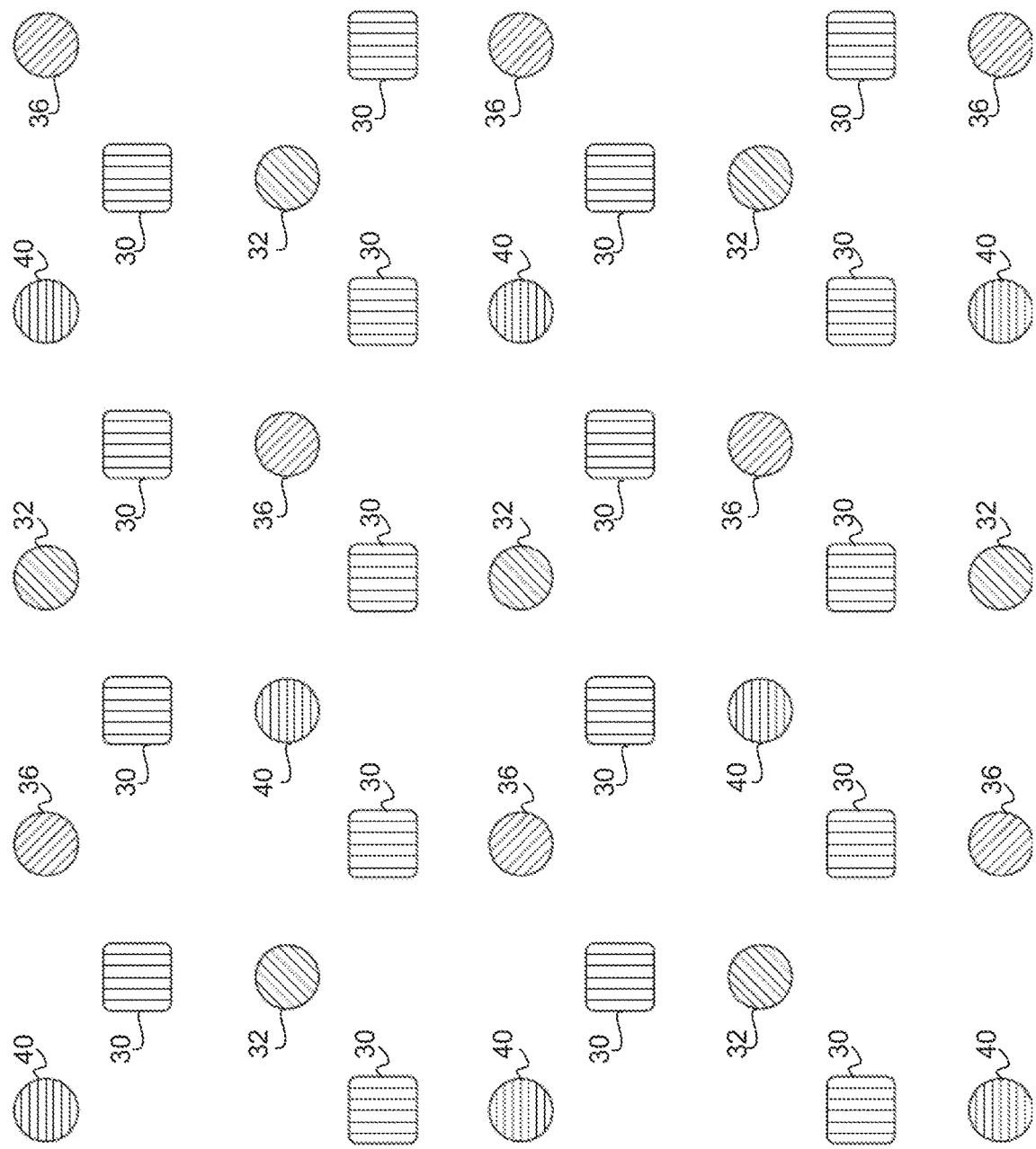

MODEL-BASED DIGITAL FINGERPRINTING

CROSS-REFERENCE TO RELATED APPLICATION(S)

This application is a non-provisional of and claims priority, pursuant to 35 U.S.C. § 119(e), to U.S. provisional application No. 62/536,496, filed Jul. 25, 2017, hereby incorporated by reference as though fully set forth.

COPYRIGHT© Alitheon, Inc. 2017-2018. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND

Technical Field

The present disclosure relates to "digital fingerprinting" of rigid physical objects for identification, authentication, tracking and other applications. Specifically, but not exclusively, this disclosure pertains to new methods for creating digital fingerprints that are substantially invariant to changes in scale, rotation, perspective, illumination, and to affine and homographic changes in viewpoint between a reference digital fingerprint and a later acquired or generated digital fingerprint of the same object.

Description of the Related Art

Many different approaches are known to uniquely identify and authenticate physical objects, including labeling and tagging strategies using serial numbers, barcodes, holographic labels, RFID tags, and hidden patterns using security inks or special fibers. Currently known methods commonly rely on applied identifiers that are extrinsic to the object and, as such, may fail to detect introduction of counterfeit or otherwise unknown objects. In addition, many applied identifiers add substantial costs to the production and handling of the objects sought to be identified or authenticated. Applied identifiers, such as labels and tags, are also at themselves at risk of being damaged, lost, stolen, duplicated, or otherwise counterfeited. There is a pressing need for more reliable object authentication technologies that are not affected by the above limiting factors.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure in order to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

There are many known approaches to establishing or reestablishing the authenticity of a rigid physical object, including secure supply chains, expert assessment and counterfeit detection, use of applied identifiers and other identification proxies, as well as image-based digital authentication methods. What is lacking, however, and is provided by the current disclosure, is the ability to perform reliable digital authentications with model-based digital fingerprints.

Additional aspects and advantages of this disclosure will be apparent from the following Detailed Description, which proceeds with reference to the accompanying drawings.

A digital fingerprinting method may be summarized as including acquiring first image data of a portion of a surface of a first physical object; constructing a first model of the portion of the surface of the first physical object from the first image data; extracting a characterizing first digital fingerprint based on the first model; and inducting the first physical object into a reference database system by storing a record in the reference database system that includes the first digital fingerprint of the first model. The first model may be based on native properties of the first physical object without recognizing identifying content attached to the first physical object.

The method may further include scanning a second physical object to capture second image data of a portion of a surface of the second physical object; constructing a second model of the portion of the surface of the second physical object from the second image data, the second model based on native properties of the second physical object, without recognizing identifying content attached to the second physical object; extracting a second digital fingerprint based on the second model; comparing the second digital fingerprint to the characterizing first digital fingerprint to attempt to authenticate the second physical object as being the first physical object; and generating a report based on the comparing.

The method may further include scanning a second physical object to capture second image data of the second physical object; extracting a third digital fingerprint from the second image data, the third digital fingerprint based on native properties of the second physical object without recognizing identifying content attached to the second physical object; comparing the third digital fingerprint to the first digital fingerprint to obtain a result; and generating a report based on the comparing.

The method may further include querying a reference database system based on at least one digital fingerprint.

The method may further include acquiring additional image data from a plurality of images of the portion of the first physical object; and constructing the first model of the first physical object based on the first image data and the additional image data. The first model may be substantially invariant to changes in at least one selected condition from among a set of conditions that includes: Scale, Rotation, Affine, Homography, Perspective, and Illumination.

The method may further include creating a three-dimensional map of the portion of the surface of the first physical object; converting the three-dimensional map into a digital representation of the portion of the surface; generating a digital fingerprint of the first physical object based on the digital representation, without reference to any image of the first physical object; and storing the digital fingerprint for at least one of subsequent authentication, tracking, and identification.

The method may further include detecting a plurality of points of interest on the portion of the surface of the first physical object represented in the first model; characterizing each point of interest by a respective feature vector; and augmenting each feature vector with at least one of three-dimensional coordinates of the respective point of interest on the portion of the surface, a surface shape characteristic, chroma, and reflectance.

The method may further include identifying a plurality of points of interest on the portion of the surface of the first physical object; and producing an n-dimensional model of the first physical object, wherein each of the identified plurality of points of interest is characterized by an n-dimensional vector. The n-dimensional vector may be associated with a plurality of parameters including at least one of: an (x, y, z) location of the corresponding identified point of interest on the portion of the surface of the first physical object, a surface shape characteristic, chroma, and reflectance.

An apparatus may be summarized as including a mounting surface; a central region spaced apart from the mounting surface to position an object for scanning the object; an array of emitters of electromagnetic radiation mounted on the mounting surface substantially facing the central region; and an array of sensors mounted on the mounting surface to detect electromagnetic radiation reflected by the object; wherein individual sensors of the array of sensors have lenses and sensor receptors, the lenses of the individual sensors focusing an area of the object onto their corresponding sensor receptors, and wherein the lenses of the individual sensors are focused and have a sufficient depth of field to permit capture of information regarding a part of the object's surface that is sufficiently in focus to allow point of interest localization and characterization of sufficient quality to allow for extraction of a digital fingerprint. Individual emitters of the array of emitters may emit visible light. The mounting surface may be formed by an interior surface of a portion of a sphere. The mounting surface may be formed by an interior surface of a portion of an ellipsoid. The mounting surface may be formed by an interior surface of a portion of a cuboid. A field of view of each individual sensor of the array of sensors may be illuminated by at least one each of red, green, and blue emitters. Individual emitters of the array of emitters may emit white light. Individual emitters of the array of emitters may be located approximately equidistant from the central region and have approximately equal intensity in operation. Individual sensors of the array of sensors have overlapping fields of view, individual emitters of the array of emitters may have overlapping fields of illumination, points on a surface of the object may be visible to at least two sensors of the array of sensors, and the at least two sensors of the array of sensors may be illuminated by one or more emitters of the array of emitters, the one or more emitters each emitting light of a different frequency. Individual sensors of the array of sensors may have red, green, and blue receptors that are tuned to respective emitter frequencies.

A method to create a depth map may be summarized as including providing an apparatus having a mounting surface, a central region spaced apart from the mounting surface to position an object for scanning the object, an array of emitters of electromagnetic radiation mounted on the mounting surface substantially facing the central region, and an array of sensors mounted on the mounting surface to detect electromagnetic radiation reflected by the object, the apparatus arranged to: with substantially all emitters of the array of emitters illuminated, imaging in each sensor of the array of sensors a physical object placed in the central region, wherein the physical object is so placed that substantially every point of the physical object's visible surface that is exposed to the central region is in focus for at least two sensors of the array of sensors; with each sensor of the array of sensors, capturing at least one image of a point of interest on the visible surface of the physical object that is in a field of view of the respective sensor; aligning various ones of the points of interest located in neighboring overlapping sensor fields of view; based on a respective known orientation and field of view of the individual sensors of the array of sensors, and from a location of the captured at least one image of the point of interest on the respective sensor, calculating a 3-space location of each point of interest on the visible surface; and storing in a database the calculated 3-space location of each point of interest on the visible surface as the depth map. The array of sensors may be sized and arranged so that every point on the physical object's visible surface that is exposed to the central region is in focus for at least four sensors of the array of sensors.

The method may further include interpolating among the 3-space locations of each point of interest on the visible surface to form a map of the visible surface; and storing the map of the visible surface in the database.

The method may further include characterizing each point of interest by a feature vector; augmenting each feature vector by three-dimensional coordinates of the corresponding point of interest on the visible surface; assembling the augmented feature vectors to form a digital fingerprint of the physical object; and storing the digital fingerprint in the database.

BRIEF DESCRIPTION OF THE SEVERAL
VIEWS OF THE DRAWINGS

In order to describe the manner in which the above-recited and other advantages and features of the present disclosure can be obtained, a more particular description follows by reference to specific embodiments thereof which are illustrated in the appended drawings. Understanding that these drawings depict only typical embodiments of the disclosure and are not, therefore, to be considered limiting of its scope, the disclosure will be described and explained with additional specificity and detail through the use of the accompanying drawings in which:

FIG. 3 is a simplified illustration of an example of an array of emitters and sensors that may be used in a system for capturing an image of a rigid object.

DETAILED DESCRIPTION

Figure 1:
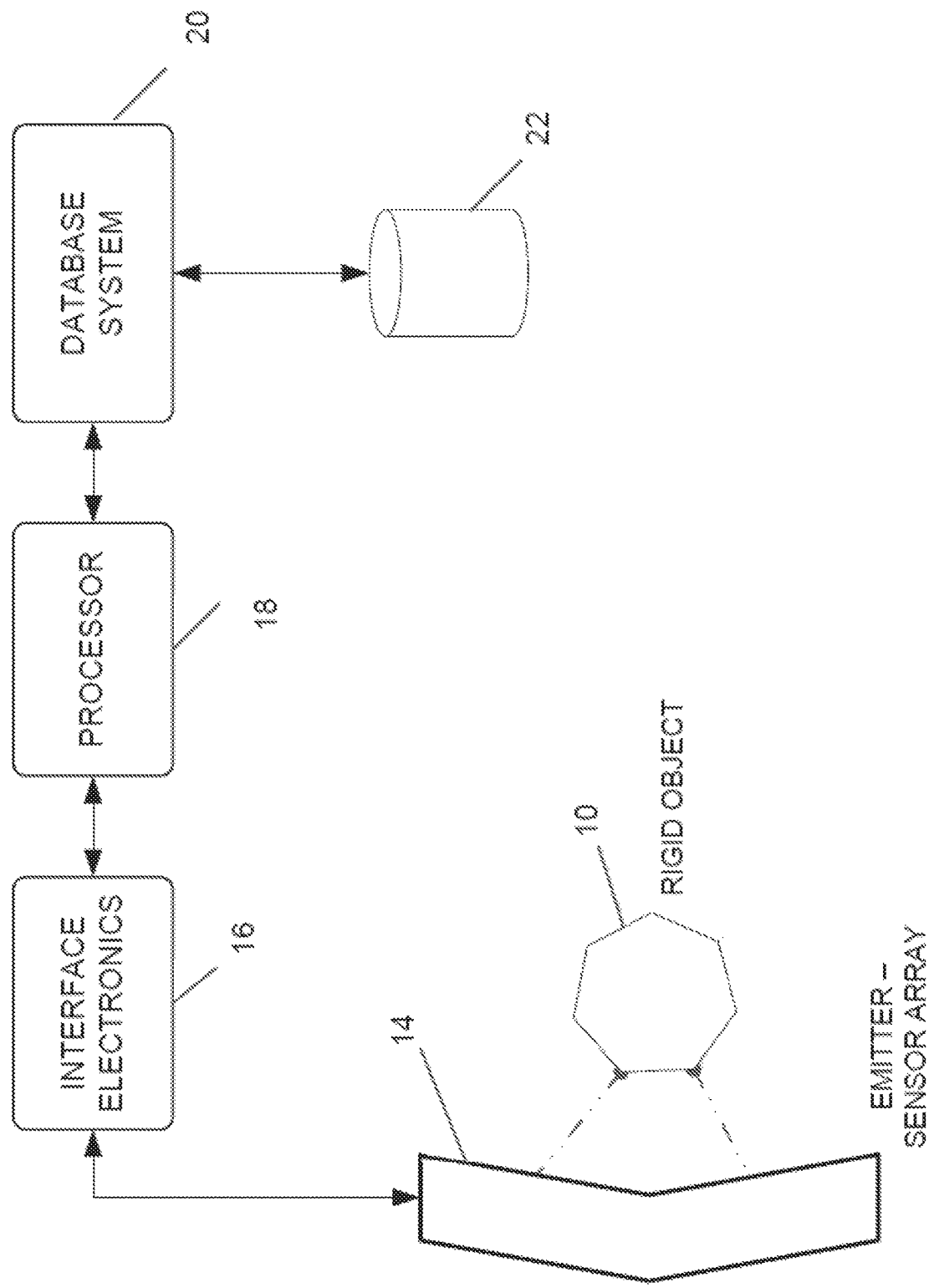
FIG. 1 is a simplified diagram of a system for capturing an image of a rigid object and generating a digital fingerprint of the object.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc., may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purposes of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The methods described in the present disclosure enable the identification of a physical object from native properties of the physical object without the need for attaching, applying, or associating physical tags or other extrinsic identifying materials with the object. A system does this by creating a unique digital signature for the object, which is referred to as a digital fingerprint. Digital fingerprinting utilizes the structure of the object, including random and/or deliberate features created, for example, during manufacturing or use of the object, to generate a unique digital signature for that object, similar to the way in which a human fingerprint references the friction ridges on a finger. Also, like a human fingerprint, the digital fingerprint can be stored and retrieved to identify objects at a later time.

Eliminating the need to add extrinsic identifiers or any physical modifications to an object offers a number of advantages to manufacturers, distributors, buyers, sellers, users, and owners of goods. Forgoing the addition of extrinsic identifiers reduces the cost of manufacturing and offers greater security than physical tagging. Moreover, physical identifiers can be damaged, lost, modified, stolen, duplicated, or counterfeited whereas digital fingerprints cannot.

Unlike prior art approaches that simply utilize a comparison of pixels, a system in accordance with the present disclosure utilizes the extraction of features to identify and authenticate objects. Feature extraction enables users to take a large amount of information and reduce it to a smaller set of data points that can be processed more efficiently. For example, a large digital image that contains tens of thousands of pixels may be reduced to a few locations of interest that can be used to identify an object. This reduced set of data is called a digital fingerprint. The digital fingerprint contains a set of fingerprint features or locations of interest (also termed "points of interest"), which are typically stored as feature vectors. Feature vectors make image processing more efficient and reduce storage requirements as the entire image need not be stored in the database, only the feature vectors need to be stored. Examples of feature extraction algorithms include, but are not limited to, edge detection, corner detection, blob detection, wavelet features, Gabor, gradient and steerable output filter histograms, scale-invariant feature transformation, active contours, shape contexts, and parameterized shapes.

While the most common applications of the system may be in the authentication of physical objects such as manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or a mechanical wave that has traveled through an object or reflected off an object or any other means to capture the surface or internal structure of an object is a candidate to create a "scan" of an object.

Various means to extract "fingerprints" or features from an object may be used; for example, through sound, physical structure, chemical composition, or many others. The remainder of this application may use terms like "image," but when doing so, the broader uses of this technology should be implied. In other words, alternative means to extract "fingerprints" or features from an object should be considered as equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function. Where the present disclosure stipulates particular imaging or scanning methods or equipment, such as an "image" or "camera," such method or equipment may be substituted by other imaging or scanning methods or scanning equipment.

Authenticating

In this application, different forms of the words "authenticate" and "authentication" will be used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference, the action described as "authentication" or "attempted authentication" may also, post facto, be properly described as an "induction." An authentication of an object may refer to the induction or authentication of an entire object or of a portion of an object.

Authentication Regions

Because digital fingerprinting works with many different types of objects, it may be useful to define what regions of digital images of objects are to be used for the extraction of features for authentication purposes. The chosen regions may vary for different classes of objects. In some embodiments, a chosen region may be the image of the entire object; in other embodiments chosen regions may be one or more sub-regions of the image of the object.

For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

In one embodiment, a passport may provide an example of feature extractions from multiple authentication regions. In the case of a passport, features chosen for authentication may be extracted from regions containing specific identification information such as the passport number, the recipient name, the recipient photo, etc. In some examples, a user may define a feature template specifying the regions whose alteration from the original would invalidate the passport, such as the photo, identifying personal data, or other regions considered important by the user. More details of feature templates are given in Ross et al., U.S. Pat. No. 9,443,298.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning a clothing label may be preferable to scanning an entire garment. To be more clear, the label or a portion of it is scanned for fingerprinting, not to recognize text or other content on the label. Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc., and is not limited to the use of visible light or to the use of light at all. As previously noted, sonar and ultrasound are, for example, appropriate scanning technologies.

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed.

In one example, wine may be put into a glass bottle and a label affixed to the bottle. Since it is possible that a label may be removed and re-applied elsewhere, merely using the label itself as an authentication region may not be sufficient. In this case, the authentication region may be defined so as to include both a label and a substrate it is attached to—in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. In a preferred embodiment, multiple authentication regions may be selected to enable the separate authentication of one or more components or portions of an object. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words, it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Fingerprint Template Definition

In an embodiment, when a new type or class of object is being scanned into a system for the first time, the system can create a fingerprint template that can be used to control subsequent authentication operations for that class of objects. This template may be created either automatically by the system or by a human-assisted process.

A fingerprint template is not required for the system to authenticate an object, as the system can automatically extract features and create a digital fingerprint of an object without a fingerprint template. However, the presence of a template may improve the authentication process and add additional functionality to the system.

TABLE 1

Example Fingerprint Template.

CLASS:
[Description of the object]
United States Passport
AUTHENTICATION REGION:
[Description of the authentication regions for the object]
Region 1: (x1, y1, z1), (x2, y2, z2)
.
.
Region n
REGION MATCH LIST
[List of the regions that are required to match to identify an object]
Region List: 1..n
FEATURES:
[Key features of the object]
Feature 1: Passport Number
Feature 2: Photo
Feature 3: First Name
Feature 4: Last Name
.
.
Feature n
METHODS:
[Programs that can be run on features of an object]
Feature 2:
    Photo Method 1: [checkphoto.exe] Check for uneven edges indicating photo substitution
.
.
    Method n
Feature n
    Method n
ADDITIONAL DATA
[Additional data associated with the object]
Data 1: example data
.
.
Data n The uses of the fingerprint template include but are not limited to determining the regions of interest on an object, the methods of extracting fingerprinting and other information from those regions of interest, and methods for comparing such features at different points in time. The name "fingerprint template" is not limiting; other data with similar functionality and a different name should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification or other applicable specification.

In example (1), an object is fingerprinted preferably during the creation process, or at any time when its provenance may be sufficiently ascertained, or at a point where an expert has determined its authenticity. Subsequently, the object is later re-fingerprinted, and the two sets of fingerprints are compared to establish authenticity of the object. The fingerprints may be generated by extracting a single fingerprint from the entire object or by extracting multiple sets of features from multiple authentication regions. Fingerprinting may also involve reading or otherwise detecting a name, number, or other identifying characteristics of the object using optical character recognition or other means which may be used to expedite or facilitate a comparison with other fingerprints. For instance, in cases where manufacturing database systems, or other object databases, use serial numbers or other readable identifiers, such identifiers may be utilized to directly access the database record for the object and compare its digital fingerprint to the original that was previously stored, rather than searching an entire digital fingerprinting database for a match.

In case (2), a fingerprinted object is compared, region by region, with a digital fingerprint of an original object to detect low or nonexistent matching of the fingerprint features from those regions. While case (1) is designed to determine whether the original object is now present, case (2) is designed to detect whether the original object has been altered and, if so, how it has been altered. In some embodiments, authentication regions having poor or no matching fingerprint features will be presumed to have been altered.

In case (3), an object may not have been fingerprinted while its provenance was sufficiently ascertainable. One example would be bills or passports created prior to initiating the use of a digital fingerprinting system. In such examples, digital fingerprints of certain regions of interest on an object may be compared with digital fingerprints from known, or suspected, counterfeit objects or with both those and fingerprints of properly authenticated objects. In one example, a photograph may be spuriously added to a passport and, as an artifact of the counterfeiting, the edge of the added photo may tend to be sharper than an edge of an original, unaltered, photograph. In such a case, fingerprint characteristics of known authentic passports and those of passports that are known (or suspected to) have been altered by changing a photograph may be compared with the passport being inspected to estimate whether the passport exhibits indications of alteration.

Digital Fingerprint Generation

In an embodiment, once an object has been scanned and at least one authentication region has been identified, the digital image, which will be used to create the unique digital fingerprint for the object, is generated. The digital image (or set of images) provides the source information for the feature extraction process.

In the present disclosure, a digital fingerprinting feature is defined as a feature or a point (e.g., a location) of interest in an object, which feature is inherent to the object itself (i.e., the feature is included in the native properties of the object). In some embodiments, features preferably are a result of a manufacturing process, other external processes, or of any random, pseudo-random, or deliberate process or force, such as use. To give one example, gemstones have a crystal pattern which provides an identifying feature set. Every gemstone is unique, and every gem stone has a series of random flaws in its crystal structure. This pattern of random flaws may be used for the extraction of feature vectors for identification and authentication.

In the present disclosure, a "feature" is not necessarily concerned with reading or recognizing meaningful content, for example by using methods like optical character recognition. A digital fingerprint of an object may capture both features of the object and features of any identifiers that are affixed or attached to the object. Feature vectors extracted from authentication regions located on an affixed identifier are based on the substances of which the identifier is physically comprised rather than the information (preferably alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the generation and use of a feature vector than a set of randomly printed lines and numbers.

Although reading identifier information is not necessary for digital fingerprinting, in some embodiments, where a user desires to capture or store identifier information (such as a name, serial number, or a bar code) in association with an object, the system may allow the user to capture such information and store it in the digital fingerprint. Identifier information may, for example, be read and stored by utilizing techniques such as optical character recognition and may be used to facilitate digital fingerprint comparisons. In some cases, serial numbers may be used as the primary index into a database that may also contain digital fingerprints. There may be practical reasons for referencing serial numbers in relation to digital fingerprints. In one example, a user is seeking to determine whether a bank note is a match with a particular original. In this case, the user may be able to expedite the comparison by referencing the bank note serial number as an index into the digital fingerprinting database rather than iterating through a large quantity of fingerprints. In these types of cases, the index recognition may speed up the comparison process, but it is not essential to it.

Once a suitable digital fingerprint of an object is generated, the digital fingerprint may be stored or registered in a database. For example, in some embodiments, the digital fingerprint may comprise one or more fingerprint features which are stored as feature vectors. The database should preferably be secure. In some embodiments, a unique identifier, such as a serial number, may also be assigned to an object to serve, for example, as a convenient index. However, assigning a unique identifier is not essential as a digital fingerprint may itself serve as a key for searching a database independent of any addition of a unique identifier. In other words, since a digital fingerprint of an object identifies the object by the unique features and characteristics of the object itself the digital fingerprint renders unnecessary the use of arbitrary identifiers such as serial numbers or other labels and tags, etc.

Example Authentication and Inspection Processes

In an embodiment, an object is scanned and an image is generated. The steps that follow depend on the operation to be performed. Several illustrative example cases are discussed below.

Case 1: For authentication of a previously fingerprinted object, the following steps may be followed:

1. One or more authentication regions are determined, such as automatically by a system, or by utilizing the authentication region definitions stored in a fingerprint template.

2. Relevant features are extracted from each authentication region and a digital fingerprint is generated. Feature extractions preferably will be in the form of feature vectors, but other data structures may be used, as appropriate.

3. Optionally, other information, for example a unique identifier such as a serial number, may be extracted and stored to augment subsequent search and identification functions.

4. The digital fingerprint of the object to be authenticated is compared to digital fingerprints stored in a database.

5. The system reports whether (or to what extent) the object matches one or more of the digital fingerprints stored in the database.

6. The system may store the digital fingerprint of the object to be authenticated in the database along with the results of the authentication process. Preferably, only the extracted features will be stored in the database, but the authentication image and/or the original image and/or other data and metadata may be stored in the database, for example for archival or audit purposes.

Case 2: For inspection of specific features of a previously fingerprinted object to determine whether they have been altered, the steps are similar to Case 1, but the process is aimed at detection of alterations rather than authentication of the object:

1. One or more authentication regions are determined, such as automatically by the system, or by utilizing the authentication region definitions stored in a fingerprint template.

2. The features to be inspected are extracted from an authentication region and the digital fingerprint is generated. The features extracted may be in the form of feature vectors for the features to be inspected but other data structures may be used, as appropriate.

3. Optionally, other information, for example a unique identifier such as a serial number may be extracted and stored to be used to augment subsequent search and identification functions.

4. The digital fingerprint of features to be inspected for alteration is compared to the fingerprint of the corresponding features from the original object stored in the database.

5. The system reports whether the object has been altered; i.e., the extent to which the digital fingerprint of the features to be inspected matches those previously stored in the database from the original object, in whole or in part.

6. The system may store the digital fingerprint of the features to be inspected in the database along with the results of the inspection process. Preferably, only the features will be stored in the database, but the authentication image and/or the original image and/or other data and metadata may be stored in the database for archival or audit purposes.

In the above cases, and in cases elaborated on in related applications, features may be extracted from images of objects scanned under variable conditions, such as different lighting conditions. Therefore, it is unlikely two different scans will produce completely identical digital fingerprints.

In a preferred embodiment, the system is arranged to look up and match objects in the database when there is a "near miss." For example, two feature vectors [0, 1, 5, 5, 6, 8] and [0, 1, 6, 5, 6, 8] are not identical, but by applying an appropriate difference metric, the system can determine that they are close enough to say with a degree of certainty that they are from the same object that has been seen before. One example would be to calculate the Euclidean distance between the two vectors in multi-dimensional space and compare the result to a threshold value. This is similar to the analysis of human fingerprints. Each fingerprint taken is slightly different, but the identification of key features allows a statistical match with a high degree of certainty, even in cases where the target object may have changed from, for example, wear and tear.

Fingerprint feature extraction is applied to locations of interest. The results for each location may be stored as fingerprint feature vectors. To clarify, a "location of interest" (often referred to as a "point" or "area" of interest) may well be a physical feature on the object, but the "feature vector" that characterizes that location of interest is not just a variation on the image around that location; rather, the feature vector is derived from it by any of a number of possible means. Preferably, a feature vector may be an array of numeric values. As such, feature vectors lend themselves to comparison and other analyses in a database system. A collection of feature vectors may be stored as a feature vector array.

The stored features (from the original object) are compared with the features extracted from the new object. As in this case, if the locations of interest are not encountered in the second object, or of the feature vectors characterizing those locations of interest are too different, there is no match (or a low confidence level for a match) for that location of interest. Variables, such as which locations must match and/or how many locations must match and/or the degree of matching required to conclude that an object matches the one previously fingerprinted, may in some embodiments be specified in a digital fingerprint record, further described below, or in some other associated record, to guide the decision process. This arrangement may be advantageous, for example, for exporting a database to a generic processor or system for remote authentication work. The matching logic may be embedded in the digital fingerprint record. Preferably, the matching logic is implemented in software as part of an authentication system.

One advantage of the feature-based method is that when an object is worn from handling or use (even very worn), a system may still identify the object as original, which may be impossible with the bitmapped approach. In addition to being able to recognize a worn object, the feature-based approach is able to address other external problems such as rotated images. This is especially beneficial in a system where an unsophisticated user, such as a retail customer, may be scanning an object to be authenticated. In such cases, external factors like lighting and rotation may not be under the system operator's control.

Further matching may be done to increase the level of confidence of the match, if desired. In some embodiments, a number of matches on the order of tens or hundreds of match points may be considered sufficient. The number of non-match points also should be taken into account. That number should preferably be relatively low, but it may be non-zero due to random dirt, system "noise," and other circumstances. Preferably, the allowed mapping or transformation should be restricted depending on the type of object under inspection. For instance, some objects may be rigid or inflexible, which may restrict the possible deformations of the object.

Summarizing the imaging requirements for a typical fingerprinting system, for example for inspecting documents, the system preferably should provide sufficient imaging capability to show invariant features. Particulars will depend on the regions used for authentication. For many applications, 10-fold magnification may be adequate. For ink bleeds on passports, bills, and other high-value authentication, 40-fold magnification may likely be sufficient. In preferred embodiments, the software should implement a flexible response to accommodate misalignment (rotation), misorientation, and scale changes. Color imaging and analysis is generally not required for using the processes described above but may be used in some cases.

Induction and Authentication

The term "induction" is used in a general manner to refer to entering an object or a set of objects into an electronic system for subsequently identifying, tracking, authenticating the object, or for other operations. The object itself is not entered into the system in a physical sense; rather, induction refers to creating and entering information (e.g., a database record) into a memory or datastore from which it can later be searched, interrogated, retrieved, or utilized in other kinds of database operations.

Induction may be done at the point of creation or manufacture of the object, or at any subsequent point in time. In some cases, induction may be done clandestinely, such as without the knowledge of the person or entity currently having ownership and/or possession of an object. The term "possession" is used in the broadest sense to include, for example, actual physical possession, as well as control—for example, having the key to a secure physical storage where an object is kept.

Methods of Digital Fingerprinting

Often the image captured in the "authentication" phase of an object's induction/authentication will differ considerably from the image from which the reference digital fingerprint was derived at "induction." This is particularly true when the second image is collected "in the field" or by users with a varying level of skill. Authentication is highly dependent on consistency between the digital fingerprint in the reference set and the digital fingerprint collected at the time of authentication. Because of the high variability of the imaging techniques and the requirement of low variability in the resulting digital fingerprint, in current approaches, considerable effort goes into making the digital fingerprint invariant to (or at least less detrimentally influenced by) the differences in the induction and the authentication images.

In the field of induction/authentication, most current approaches to invariance are "image based" and fall broadly into two categories: a) preprocess the image to remove the distortions, or, b) make the point of interest descriptors insensitive to expected variations. SIFT (Scale Invariant Feature Transform) and SURF, for example, use (approximately) circularly-symmetric feature descriptors to improve rotation invariance. The latter approach is the more common (making the feature vector descriptors of the individual points of interest invariant, or partially invariant to expected changes in the image). Thus, for example, a point of interest descriptor may be circularly-symmetric so that the resulting feature vector is independent of rotation (see above). Or a feature vector descriptor may be extracted at multiple scales, making the result less sensitive to scale changes. Current techniques such as SIFT and SURF extract descriptors at multiple scales and interpolate among them when making comparisons.

This standard approach does well in removing some or even most of the sensitivity to the changes, but it introduces another set of problems. One prominent problem is that the more a feature vector descriptor of a point of interest is invariant, the more discriminating information is removed that might later have been used to distinguish that point of interest from another that varies only in the information that was discarded. The less discriminating the point of interest descriptors are, the lower (in general) the accuracy of authentication.

"Invariance" means that something (in this case, the digital fingerprint of an object) does not change when the condition to which it is invariant changes. Standard desired forms of invariance include: Scale, Affine, Rubber-sheet, Rotation, Homography, Illumination, and Perspective.

Scale invariance is when uniformly changing the size of the object (or the resolution of the image of the object) does not change the digital fingerprint. A change in scale preserves both relative and absolute angles, the straightness and parallelism of lines, and the ratios of lengths but not the lengths themselves.

Rotation invariance is when rotating the object (image) around the line from the camera through the object does not change the digital fingerprint. A rotation preserves relative, but not absolute angles, preserves the straightness and parallelism of lines, and both absolute lengths and the ratios of lengths.

Affine invariance is when an object (image) is stretched or sheared. It is the change that occurs in the image of a flat object when the object is rotated out of the plane perpendicular to the camera-object line when the object is "at infinity." It preserves neither absolute nor relative angles. It preserves parallelism but not lengths or the ratios of lengths. It keeps straight lines straight.

Homographic invariance is the change that occurs in a flat object rotated out of the plane perpendicular to the camera-object line when the object is not "at infinity." It keeps straight lines straight but preserves nothing else. In particular, it turns rectangles into trapezoids.

Perspective invariance is the change that occurs when a three-dimensional object rotates out of the plane perpendicular to the camera-object line. It is similar to homographic invariance except that parts of the object that were in view may no longer be in view, while new areas of the object may come into view.

Rubber-sheet invariance is the change that occurs when an object (image) is distorted by local rotations, stretches, and other distortions that vary from place to place. Those distortions can occur in the plane perpendicular to the line of sight of the camera or out of that plane. Projective changes resulting from changes in the distance of the camera from a three-dimensional object are a kind of rubber sheet distortion.

Illumination invariance. Complete illumination invariance is impossible because some light must illuminate an object in order to capture information from it, but it is possible to reduce the effects of shadows, color changes, and illumination angles substantially.

This disclosure teaches an integrated process that enables a digital fingerprint to be extracted from a rigid object for induction, authentication, identification, and/or tracking in such a way that the individual point of interest characterizations do not need to possess any form of invariance themselves but the resulting system is strongly resistant to (or actually invariant to) scale, rotation, affine, homography, perspective, and illumination changes. The only standard form of system invariance not significantly improved by what is taught here is rubber sheet variation, which is why the above description speaks of a rigid object.

The novel approach described in this disclosure entirely sidesteps the invariance problem by capitalizing on two simple but novel observations: the most invariant thing about a rigid object is the object itself rather than any possible image of the object and, therefore, the extracted digital fingerprint should be based on native properties of the object itself and not of any particular image of the object. This concept of moving the digital fingerprinting from the image to a model of the object is understood heretofore to be entirely unknown in the literature.

For simplicity, "induction" and "authentication" may be used as a shorthand for the first and second (or subsequent) capture of an object's digital fingerprint, respectively, regardless of whether that second digital fingerprint is to be used for authentication, identification, tracking, or other purpose.

The approach of the present disclosure is to capture sufficient information to create an invariant model of the object and then extract a characterizing digital fingerprint of the object from that model (rather than from any image or set of images of the object). This approach removes the need for the point of interest characterizations to contain the invariances and instead makes use of the invariance of the object itself. To be clear, characterizing a rigid object in such a manner that its surface features (including chroma and reflectivity) become part of a known model of the object and then extracting the digital fingerprint from that model means that the resulting point-of-interest feature vector surface feature characterizations do not need to throw away discriminating information to achieve invariance, and hence, that no such information is lost in creating the fingerprint.

Once a model is created, it is possible after the fact to calculate what the object would look like from any angle and under any form of illumination. This means that substantially identical models of the object can be created under varying illumination conditions. Once such a model is constructed, any desired "standard angle" and "standard illumination" could be applied, the digital fingerprint calculated, and the result compared with other fingerprints taken under or calculated from other object models to, for example, determine which reference model best matches the current model. What is taught here encompasses any attempts to "recalculate" the image prior to extracting the digital fingerprint, and further teaches that a digital fingerprint may be extracted not only from any computed image of the object but more beneficially, from the model's characteristics themselves (which, by definition, are properties of the object and not of the lighting or imaging). These two teachings (back-calculating the effect of some canonical lighting and then extracting the fingerprint and calculating the fingerprint from the model rather than from an image) are both novel and are related, but they are distinct. In the teachings of this disclosure, the model is created using one or more images of the object, so imaging the object well improves the processes described herein. But in this teaching, the images are akin to "probes" to find out characteristics of the surface itself and build a model of that surface from that information. Once the model is built, the digital fingerprint may be extracted from the model.

Using any more-or-less invariant model of a rigid object to extract a digital fingerprint (either from the model or from any recalculated illumination of the model) falls within the purview of this description. To be useful, such a model will contain at least enough information to achieve the desired invariances and to distinguish it from similar objects.

A process, in one embodiment, comprises the following: a model is built by capturing multiple images of an object. The images in one sense cover the range of images that might later be collected of the object at identification/authentication/tracking. The images cover the range but need not "fill in all the gaps." In other words, the purpose of the different images is to act as "probes" of the surface to detect invariant information about the object. This can be done without taking every possible image of the object.

The images are used to construct a model of the surface (for monochrome captured images, that surface model may just show the gray scale of the surface and hence not require the images be taken in different colored light. For color captured images, it might show the chroma of the surface as well). The model may include reflectance properties such as specularity or back-reflection as well.

One useful and notable aspect of the model-based approach is to use the imaging solely to gather data on the actual native properties of the object, and then extract the digital fingerprint from the model (that has the actual properties of the object so far as is determinable from the different images collected), rather than from the images.

Figure 2A:
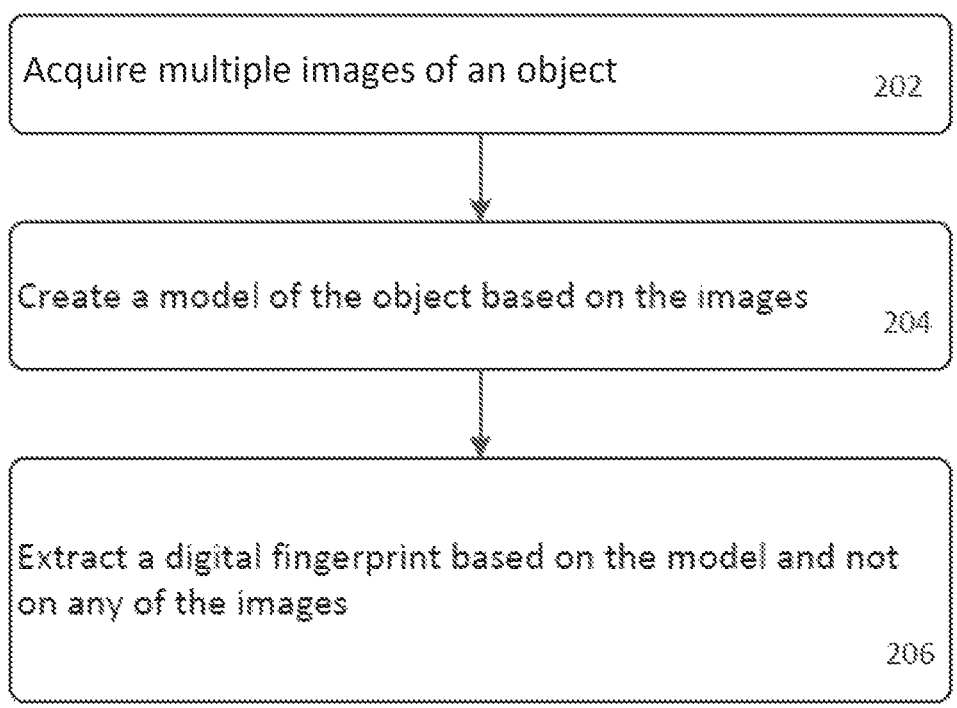
FIG. 2A is a simplified flow diagram of a process for generating model-based digital fingerprints.

FIG. 2A is a simplified flow diagram of such a process in an embodiment. As discussed herein, the process begins with capturing multiple images of an object, block 202. Then, a model of the object is created based in the images, block 204. Finally, a digital fingerprint is extracted based on the model and not based on any of the images, block 206.

A brief illustration: If a red light is shone on an object and the camera responds strongly in the red range, the conclusion might be drawn that the object is red. But if a blue and green light is then shone on the object resulting in the same strong response, the conclusion can be drawn that the actual surface is white, even though the object was never probed with white light. This shows one advantage of acquiring multiple image data.

Based on the multiple images, a model may be constructed of the object that may include its three dimensional (3D) shape, its chroma, its reflectance properties, and/or other things. As discussed herein, the model only seeks to be invariant enough to accommodate expected variations in later lighting or positioning variations. Sufficient discrimination is needed to perform later identification, tracking, authentication, etc., to an acceptable level of confidence.

A digital fingerprint may be extracted from the characteristics of the model and not from the images directly. Substantially the same model could be constructed from a totally different set of images, provided they met the characteristics mentioned above of covering the range of expected variations. This digital fingerprint is formed from the model and is more or less independent of the specifics of the lighting conditions under which its input images were taken. The digital fingerprint also is not dependent on any non-native features added to or otherwise present on the object for identification, such as a tag or label (although it would be affected by something adhered on to the surface of the object, not because of information content like a bar code, but because the label changes the surface of the object. That digital fingerprint may be stored in a database for later use.

Later on, a second digital fingerprint is extracted of the object. This process may involve creating a second model of the object that is believed to be substantially identical with the originally-created model. Models are considered "complete" when applying additional images (from different angles, of different colors, etc.) does not result in significant changes to the model.

The second digital fingerprint may, on the other hand, not be created from a model, but instead from one or more images of the object without the intermediate step of creating the model. This second digital fingerprint can then be compared with digital fingerprints of stored reference models as though the models were seen from different angles and under different illumination conditions. In other words, each model can be used to provide a series of reference digital fingerprints that show the object under essentially any desired illumination and viewpoint conditions.

Figure 2B:
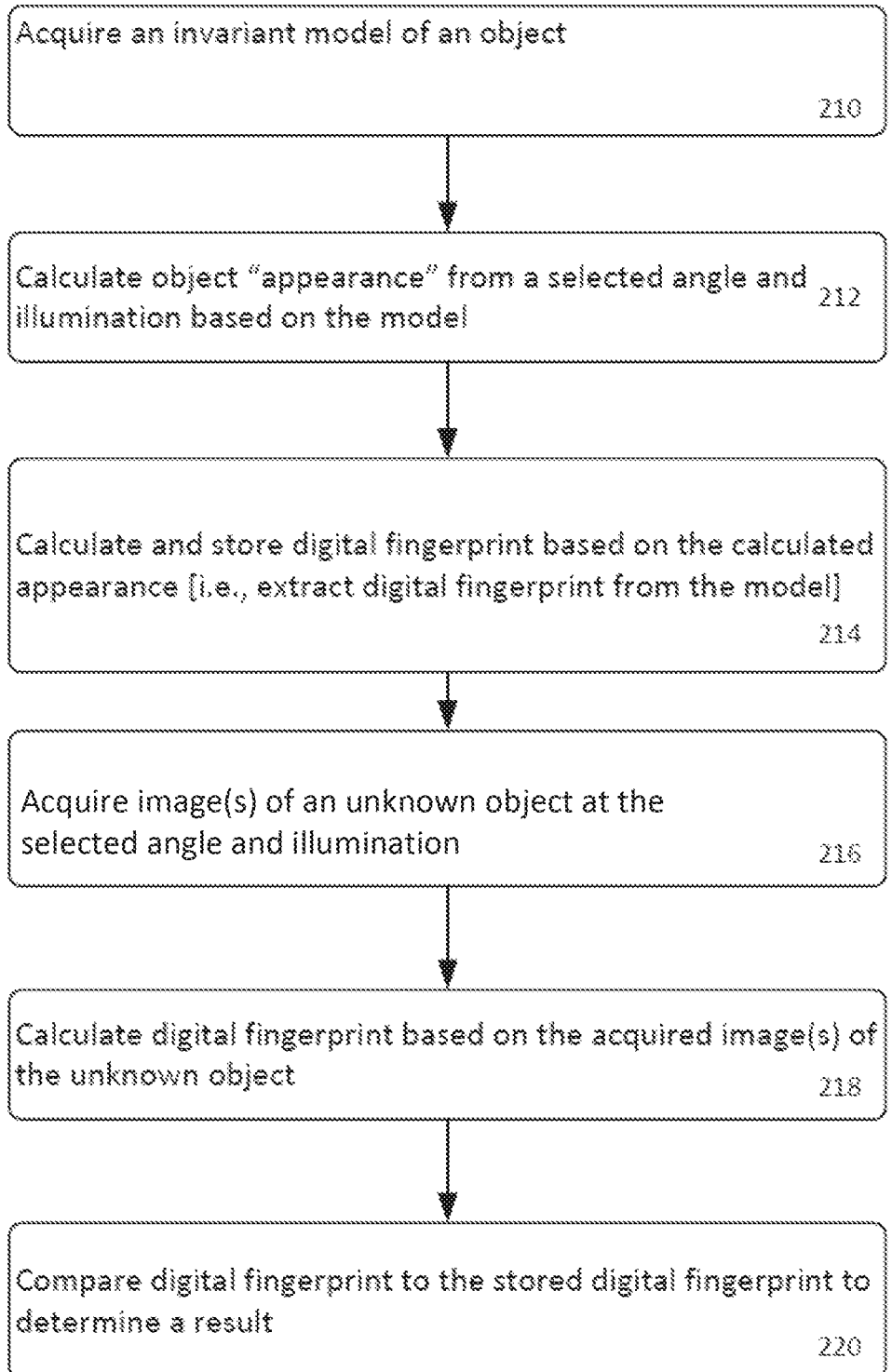
FIG. 2B is a simplified flow diagram of a process for identifying or authenticating an unknown object utilizing model-based digital fingerprint techniques.

FIG. 2B is a simplified flow diagram summarizing such a process for identifying or authenticating an unknown object utilizing model-based digital fingerprint techniques. To begin, an invariant model of a known object is acquired, block 210. Next, the object "appearance" is calculated from a selected angle and illumination based on the model, block 212. Next, a digital fingerprint is calculated and stored based on the calculated appearance, i.e., a digital fingerprint is extracted from the model, block 214. The process thus far may be referred to as induction of the known object into the database system. Subsequently, one or more images of an unknown object are acquired at the selected angle and illumination, block 216. A digital fingerprint is calculated based on the acquired image(s) of the unknown object, block 218. Finally, the digital fingerprint of the unknown object is compared to the stored (or "reference") digital fingerprint of the known object, block 220.

Figure 2C:
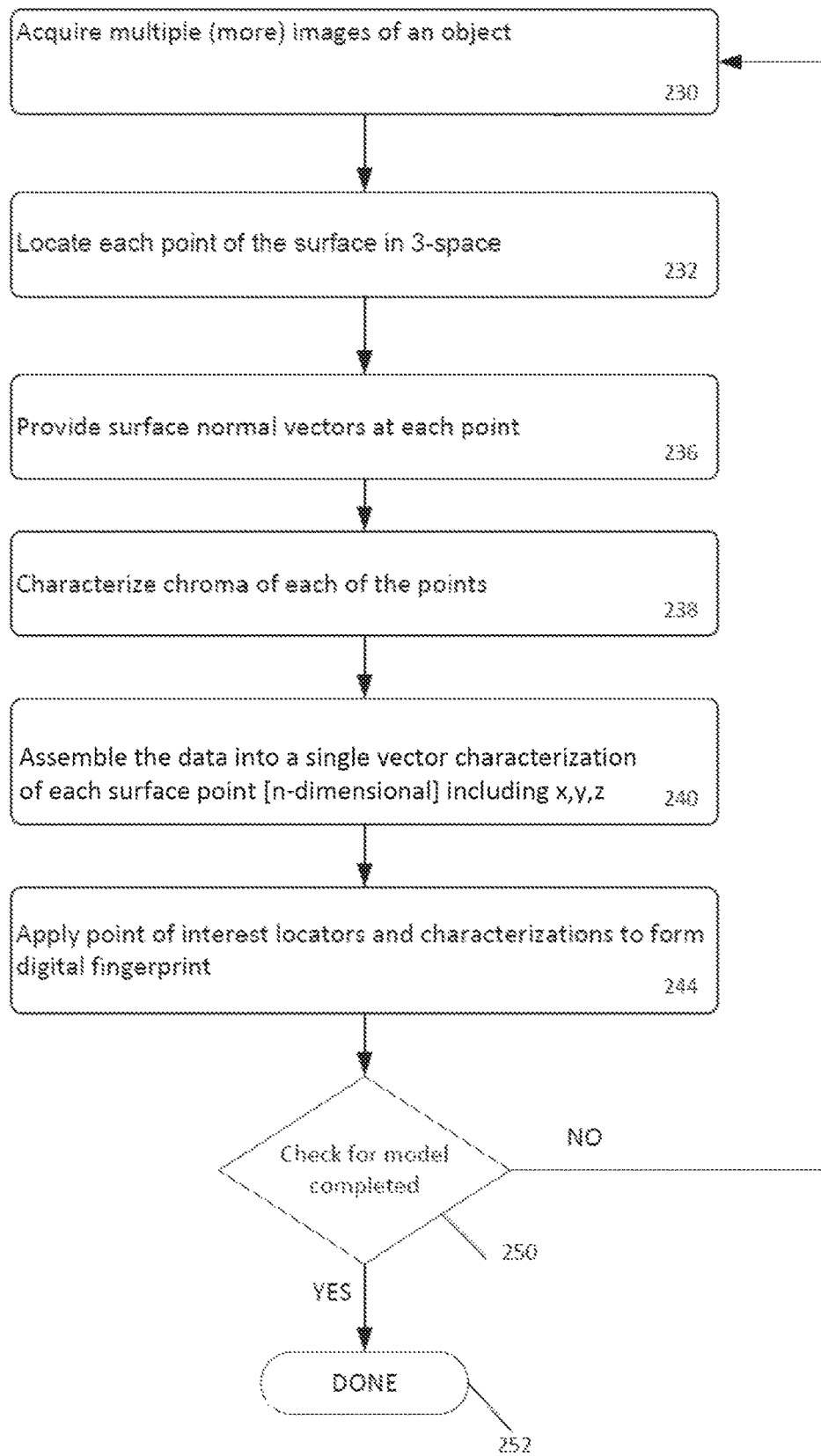
FIG. 2C is a simplified flow diagram of a process for building a model from one or more images of a rigid object and generating a digital fingerprint from the model.

FIG. 2C is a simplified flow diagram of a process for building a model from multiple images of a rigid object and generating a digital fingerprint from the model. To begin, the process calls for acquiring multiple images of an object, block 230. Then locating each point of the object surface in 3-space, block 232. Next, providing surface normal vectors at each of the located points, block 236. Next, characterizing chroma for each of the points, block 238. Then assembling the data into a single vector characterization of each surface point [n-dimensional] including x,y,z, block 240. Next, applying point of interest locators and characterizations to form a digital fingerprint, block 244. Decision 250 checks for completion of the model, and if it is not complete, the process loops back to block 210 to acquire more images of the object. If the model is done, the process is completed at exit 252. These various steps are described in more detail below.

A 3-D Representation of the Object

In some preferred embodiments, the model that is built at induction must contain the surface positions of enough of the object to enable a useful digital fingerprint to be extracted wherein that digital fingerprint contains information at surface positions on the object. Such information might, for example, contain the three-dimensional coordinates of points of interest on the surface, the directions of surface normals at those points, various curvature features, and so on. Each of these features is added to the digital fingerprint to improve discriminating this object from other, similar objects. The area so characterized need not include the surface of the entire object, but it must be enough so that when the model is reconstructed at authentication, the two models can be compared. Modeling the entire surface may make this comparison easiest to do. Further, that shape information may be used in concert with other digital fingerprint information such as surface feature characterizations to distinguish two objects.

The characteristics of the model may be built in a variety of ways. For a 3D representation, data from structured light, stereo, structure from motion, focus stepping, or other ways to capture 3D data would be acceptable, for example. Similarly, any point of interest characterization known in the industry or later developed, such as SIFT or SURF, likely provides either alone or in concert with such 3D data enough object characterization to allow satisfactory authentication when used in the techniques taught herein. One method is described as an embodiment below.

This 3D representation of an object has several purposes, some of which will be described herein. One advantage of the present disclosure pertains to the 3D representation in particular: it is possible by many different means to extract digital fingerprints for later comparison of objects solely from the 3D model without any reference to any image of the object.

In one example, a 3D surface map of an object may be created through any of various means, including stereo or structured light imaging. Next, the depth map may be converted into a digital representation of the portion of the surface such as a pseudo-gray-scale representation of the surface. This surface may be "unwrapped" as described herein or it may be viewed from a particular direction and distance. Then, the digital fingerprints may be extracted by any relevant means from the digital representation (e.g., pseudo-gray-scale image). Several specific examples are given below. The resulting fingerprint may be defined as the "3D fingerprint" or "3D fingerprint component" of the object.

In addition to using the 3D representation on its own, the 3D fingerprint may be used as a component of an authentication system that also uses other means to extract digital fingerprints of the object. Below, an embodiment is described that uses the 3D fingerprint and the surface characteristics of the object in an integrated digital fingerprinting system.

In preferred embodiments, the 3D surface model described here should have sufficient resolution to meet its required use. If it is to be used on its own to extract 3D fingerprints, the surface map should be captured with sufficient resolution to allow the extracted 3D fingerprints to contain enough information to distinguish an object from other, similar objects based on shape and surface map alone. If the model is used in an "unwrapping" or "normal view" approach such as are described herein, it should contain sufficient resolution to allow the steps dependent on it to be performed accurately. In some embodiments, additional features may be captured and used in an object model, such as directions of the vectors normal to the surface, different curvatures (for example Gaussian, mean, principal), and other shape characteristics.

Chroma- and Monochrome-Independent Surface Characteristics

There are many known ways to start with multiple images of an object and, provided there is significant variation in the images, construct a model of the imaged surface that is invariant (in a least-squares sort of way) to the variations seen in the input images. Several approaches, for example, are known in the literature for achieving chroma invariance using multi-spectral illumination and multiple bands of color sensitivity in the imager.

The present disclosure does not require any particular approach to achieving either a chroma- or reflectivity-invariant representation of the surface. Many approaches are suitable for use in the context of the present disclosure. Two possible approaches to chroma-invariance (1-dimensional and 2-dimensional) are provided in the Appendix. A novel approach to monochrome invariance is also presented there. The monochrome invariance assumes for simplicity a Lambertian surface, but that restriction is easily removed (at the expense of somewhat more complex mathematics and the need to acquire some more images of the relevant surfaces).

It should again be stressed that the methods disclosed herein are not dependent on any particular method of modeling either the chroma or the reflectance of the surface of the object being fingerprinted. The monochrome-independent approach described in the Appendix also gives as a result of its mathematics the surface normal at all (visible) points on the object. This gives a check on the 3D mapping and also helps in the execution of the embodiments presented below. Such features as the surface normals may also be determined in other ways as well.

Mapping the 3-D Surface to the (Multiple) Images

In an embodiment, multiple images may be captured from different angles and a 3D surface map calculated by normal stereo (or multi-image) mapping. This approach combines existing point-of-interest detection and characterization technology with multi-image mapping and is described further in an embodiment discussed below.

If the surface location map is created by structured light or other method separate from the imaging process, the surface image mapping produced in the previous section must be mapped to the 3D structure produced in the first section. Image/surface projection techniques are well understood in the industry, however, their use herein in combination with other techniques may be considered new. This disclosure requires no particular approach to image mapping provided the method used maps the image elements to the 3D surface locations at a resolution sufficient to allow extraction of well-discriminating digital fingerprints.

Capturing the Digital Fingerprint

The goal is to produce a digital fingerprint of a rigid object that is as invariant as possible to changes in viewpoint angle, illumination, and all the kinds of change discussed herein. Two ways to achieve this goal are presented as examples below and are not meant to be limiting. It will be seen by those skilled in the art that mathematically, the two approaches are identical, and that there are many other ways to achieve the same or effectively identical results. The two approaches, therefore, are presented as thought aids of imperfect physicality to understand the mathematical formulations presented herein.

Certain mathematical concepts are presented in the Appendix section of the present disclosure. Even if these concepts of the Appendix are not used to determine the surface normal vectors, the surface normal vectors can be determined by smoothing the area around each mapped surface point and finding the outward-pointing unit vector perpendicular to that surface, by structure from motion methods, or in other ways.

Normal view. Because the surface location and/or unit normal vector at each location is known, as indicated in the Appendix, once the invariant chroma and reflectance maps are created, the point-of-interest characterizations can be determined as though unwrapping the surface or by looking straight down onto the surface from a known distance and in a known orientation with a known illuminant. It will be seen how this removes all the forms of variability discussed herein. From that view of the surface, points of interest can be discovered through any manner or means (the common approach of finding places where "a lot is happening" works well), each point of interest characterized by a feature vector, and that feature vector augmented by the three-dimensional coordinates and other structural object features around the point of interest on the surface. How these last three components are weighted relative to the other parts of the descriptors is outside the scope of this disclosure, though many ways may be found included simply running experiments to determine the relative weightings that give acceptably favorable results for a given set of objects.

Surface unwrapping. Another, related approach is to treat the 3D surface model as a 2D manifold embedded in 3-space and to use standard techniques for "unwrapping" the manifold. Some obvious standard techniques include Sammon mappings, and Hessian or Laplacian Eigenmaps. One approach that has shown success has been to impose a non-Euclidean coordinate system on the surface and using the techniques of tensor calculus. The resulting unwrapped surface then has points of interest detected and characterized and an aggregate feature vector (using either the original 3D space coordinates or the resulting 2D space ones) formed as described herein.

Description of an Embodiment

FIG. 1 is a simplified diagram of an example of a system for capturing an image of a rigid object 10 and generating a digital fingerprint of the object. An array 14 of sensors and emitters preferably is curved. In an embodiment, the array 14 is provisioned on the inside surface of a portion of a sphere near the center of which is placed the object 10. One possible array is shown in FIG. 3. The array in FIG. 3 includes sensors 30, red emitters 32, green emitters 36, and blue emitters 40.

The sensors 30 preferably have lenses that focus an area of the object onto the sensor receptors. Those lenses must be so focused and have sufficient depth of field that the part of the object's surface in each field of view is sufficiently in focus to allow point of interest localization and characterization of sufficient quality to allow extraction of functional digital fingerprints as further described below.

This pattern illustrated in FIG. 3 may be repeated across the interior of the spherical segment surface. This is not meant to be a "design" of an emitter/sensor array but merely to suggest a possible one. In a preferred embodiment, the field of view of each sensor is illuminated by at least one red emitter 32, green emitter 36, and blue emitter 40 at approximately equal distance and intensity. The sensors 30 have overlapping fields of view and the emitters 32, 36 and 40 have overlapping areas they illuminate. Every point on the surface of the object preferably is visible to four or more sensors and is illuminated by at least one of each color emitter.

Each sensor may have within it red, green, and blue receptors (not shown) that are tuned to substantially match the corresponding emitter frequencies. As the equations in the Appendix show, it isn't particularly critical how wide the emission spectra of the emitters or the sensitivity spectra of the sensors are, provided that they are broad enough to provide discrimination among objects similar except for their chroma and narrow enough to allow the equations of the Appendix to be at least approximately true. The 3-space location of each sensor and each emitter is known. For each sensor, the orientation of the sensor and its angular field of view is known. In this embodiment, the lens-sensor system is aimed at the center of the sphere and a point object at that location will be at the center of the sensor's field of view.

Referring again to FIG. 1, the emitter-sensor array 14 is coupled to suitable interface electronics 16, both for powering the devices, and capturing signals output from the sensors. The electronics 16 are coupled to a processor or computer 18 for processing the captured signals. The processor may execute software to process the signals as described herein, to create a model of the object, and to create a digital fingerprint of the object from the model. The model, and the digital fingerprint, may be stored in a data store 22 by a suitable database system 20, details of which are known.

Creating the Depth Map

In a preferred embodiment, a method for creating the depth map may proceed as follows. With all emitters on, each sensor images a physical object 10 placed at the center of the sphere. The physical object is presumed to be small enough so that every point of its substantially visible surface is in focus for at least two sensors (and preferably four). In each image, points of interest are located and characterized by some standard method. The purpose is to increase the likelihood that what is visible to more than one sensor can be aligned and its 3-space location determined. There should be sufficient resolution of the points of interest that essentially the entire substantially visible surface can be mapped as described herein to an acceptable accuracy. In general, this accuracy will be sufficient when the surface is deemed to have approximately constant curvature over an area at the smallest point of interest characterization scale.

Points of interest in neighboring overlapping sensor fields of view are aligned and from that alignment, from the known orientation and field of view of the sensors, and from the location of the point-of-interest image on the sensor, it is possible to calculate the 3-space location of each point of interest on the surface and hence, by interpolation, the 3-space location of each point on the surface. Stereo distance calculation is straightforward with two sensors; in the case where three or more sensors can see the same location, the 3-space location of the points of interest can be calculated to minimum least-squares error. Once this is achieved, and, using the additional information generated about surface normal vectors determined in the math shown in the Appendix or known in the field, the three-dimensional coordinates and outward-pointing unit surface normal vector at each point may be determined. ("Outward" may be defined from the center of the sphere so that the dot product of the surface normal vector and the line from the center to the surface at that point is non-negative or in some other consistent manner.) From the surface normal vectors many other geometric properties of the surface can be generated by standard techniques. Among these are different types of curvature and, where appropriate, their directions.

Because the location of each surface point in 3-space and the location of the image of that point on the relevant sensors are known, it is possible to map the images captured by each sensor onto the model surface to produce a 3D visible model of the object, were one desired.

Chroma and Reflectance Characterization

Once a 3D surface of the model has been determined, it remains to characterize the invariant properties of that surface in addition to its location. In a preferred embodiment, an essential principle employed in determining the chroma and reflectance of the surface (which are independent of the illuminant) is to take sufficient images of each point on the surface that the response of each point to essentially any illumination that falls within the range of the illuminants employed (whether different in color, orientation, or intensity from the acquiring illumination) can be calculated. It should be stressed again that it is not necessary to actually calculate the surface's response to some kind of "canonical" illumination. The aim is to determine the surface characteristics that would allow a user, if the user so desired, to calculate such a response. However, since the points of interest will be located and characterized in the model itself, calculating a canonical illumination is unnecessary.

It will be noted that in a preferred embodiment, points of interest will be found and characterized twice, once from the images recorded by the sensors and once from the model of the object. The same techniques can apply in both cases. "Invariance" is achieved in the first case by having the sensors and lights close enough together so that the located and characterized points of interest are sufficiently overlapping in the near-by images to allow the images from neighboring sensors to be aligned and their 3-space locations calculated. It is achieved in the second by characterizing the invariant surface of the model.

Following the math presented in the Appendix, or by other appropriate means, a chroma- and reflectance-invariant model of the surface is calculated. A few points are worth making at this juncture. First, while "invariance" is sought in the model, it is only important to be invariant up to the changes in illumination, scale, etc. that are expected between the induction acquisition and the authentication acquisition. Were a user to know that both acquisitions were to be done with the same monochromatic blue light, for example, it would not be necessary to determine the chroma-invariant characterization of the model's surface—the reflectance model would be sufficient.

Second, it is not necessary that the induction and authentication stations be identical. It is only necessary that they allow the production of sufficiently similar models of the object. Finally, as the Appendix makes clear, it may be beneficial to assume a model of reflectance and one of chroma. Provided the chosen models can be mathematically described, the techniques described here can be extended to cover them, though the more complex the model (that is, the number of free parameters in the characterization), the greater the number of images of the object that must be captured to accurately build the model. The math in the Appendix is for a Lambertian surface, which suffices for many objects of interest including, but not limited to, bags (i.e., luggage) and human faces. It is straightforward to extend that math for a linear combination of specular and Lambertian reflectance and (with somewhat more difficulty) to any model of surface reflectance including back- and side-scatter. It is also possible, and within view of this disclosure, to model the reflectance parametrically and use the multiple captured images to determine the parameters. The more parameters, the more varied the captured images must be and the more complex the mathematics to create the invariant model. Such variances are all within view in this disclosure.

Digital Fingerprint Creation

In a preferred embodiment, the user will have a model of the surface that locates each point in 3-space, provides the surface normal vectors at each point, derives surface shape characteristics from the coordinates and the surface normal vectors, characterizes the chroma and reflectance of each point, and ties all the information together into a single vector characterization of the surface point. In other words, the user will have produced an n-dimensional model of the object, that is, a model of the object wherein each point is characterized by an n-dimensional vector. Three of those parameters are the (x, y, z) location of the point on the surface (with, possibly, the center of the sphere being the origin). Other parameters related to derived shape characteristics. The remainder are the chroma and reflectance parameters. The latter may be as few as one (a monochrome Lambertian surface, for example) or much higher, depending on the dimensionality of the normalized color map produced in determining the surface chroma and depending on the complexity of the reflectance model.

To the "surface" in this higher dimensional space the user applies point of interest locators and characterizations and extracts from the model the point of interest locations and characterizations that form the digital fingerprint of the physical object. The user follows the same procedure at induction and authentication. If the model building has been successful, and if the physical object is rigid, two models of the same physical object should be very similar and the characteristics of the points of interest should not require any externally-imposed invariance (which as we have seen reduces their discriminatory ability).

In one embodiment, to find points of interest, one may begin with two independent variables (the x, y location on the image) and one dependent variable (the gray-scale value of the image at that point). A method such as DoG (difference of Gaussians) or Laplacian point of interest location can be applied to find candidate points of interest and then various normalized gradients to characterize the region around each point of interest. But there is nothing magical about a 3-dimensional feature space. With proper scaling (probably determined experimentally), a user can apply the same techniques to k independent and m dependent variables in much the same way. In the embodiment discussed here there are 3 independent variables (the x, y, z location of the surface points), one-three dependent variables for chroma, some number (depending on reflectance model) for the reflectance, and additional geometric features.

How to Determine When Building the Model Is Completed?

In a preferred embodiment, several images are captured of the object both at the same time and in rapid succession so that each point on the surface is hit with enough variable lighting to enable the 3D chroma- and reflectance-invariant model of the surface to be created. The user generally wants to take as few images as possible if for no other reason than to have the process work as rapidly as possible. But how does a user know when enough data has been captured? A simple approach will suffice: the model is sufficiently complete when the addition of new data does not materially change the model. In other words, if the model points are described by k independent variables and m dependent ones and the acquisition of another image changes none of them by more than a token amount, then the model may be considered to be complete. If the user was careful to ensure that the variations already captured cover the possible differences between induction and authentication, nothing further need be done.

Appendix—Three Imaging Approaches To Illumination Invariance

A first approach combines multiple images of the same object taken under different lighting conditions with the idea of producing an image that produces a more consistent digital fingerprint or that matches well enough the digital fingerprints of the individual images that go into creating the composite image.

A second approach combines the color planes of a single RGB object image to create a one-dimensional color mapping that can be made into a pseudo-gray-scale image from which digital fingerprints can be extracted. This approach was outlined in W. Maddern, et al., Illumination Invariant Imaging: Applications in Robust Vision-based Localisation, Mapping and Classification for Autonomous Vehicles.

A third approach starts with the concepts of the second approach, but develops a new approach that uses multiple images of the same object under different lighting conditions to create a one-dimensional mapping. As in the second case, the one-dimensional mapping can be transformed into a gray-scale image from which digital fingerprints may be extracted.

The distinction in the title that these are "Imaging Approaches" is to distinguish what is covered in this Appendix from two different approaches. This Appendix starts with a set of images taken under different conditions and seeks to produce an image that is invariant to the changes that distinguish the input set of images. A second approach combines digital fingerprints from multiple images of the same object into a set that is used as a reference for that object. Approaches to do this may include (1) "union of all digital fingerprints" and (2) "intersection of all digital fingerprints" though, in fact, there are many other ways to combine digital fingerprints for this purpose. The third approach from which those in this Appendix are to be distinguished is to make the digital fingerprints themselves invariant or less variant to changes in illumination.

Image Combination

The first approach to image invariance is to produce an image that combines multiple other images of the same object with the idea of creating a single image whose digital fingerprints will be less sensitive to illumination changes in the range of the images that created the composite. This is to be distinguished from the idea of using multiple images to create a 3D surface map of the object that can then be digitally fingerprinted from any angle.

There are many ways to combine images that might create a composite less sensitive to changes in lighting condition. In theory at least, it is desirable to combine multiple images taken under different conditions and combine them so that the resulting image looks more like an image of the object taken under "ideal" lighting conditions. In this context "looks like" means "has a similar digital fingerprint to."

One approach to combining images utilizes a simple average. Additional approaches would take the median pixel value instead of the average, would take the brightest pixel, or would normalize pixel values by the average value of a local region, or many other approaches. In this discussion, the simple average is addressed. Looking at example images, it appears that the average produces a more uniform level of illumination. It is particularly interesting to see whether the average of L1-L4 produces a better digital fingerprint than L0 does for matching L1, L2, L3, and L4 separately.

One-Dimensional Color Mapping

The second approach is outlined in W. Maddern, "Illumination Invariant Imaging: Applications in Robust Vision-based Localisation, Mapping and Classification for Autonomous Vehicles." This starts with one three-color image of the scene and, based on knowledge of the light source and the camera sensors, performs a mapping to a one-dimensional space that is supposed to preserve primarily texture information.

The following discussion follows the derivations in that paper, though with a few modifications to makes things more straightforward. The signals received at the camera that originate from a location on the image $\vec{x}$ are defined as $\vec{R}(\vec{x})$. If it is assumed that the emissions of the lights, the responses of the sensors, and the reflectivity of the surface itself are all dependent on wavelength $\lambda$, the following equation can be set up:

$$\vec{R}(\vec{x}) = G(\vec{x}) * I(\vec{x}) \int S(\vec{x}, \lambda) * E(\lambda) * F(\lambda) d\lambda$$

Here, G(x) is a geometric term relating the surface normal of the object, the light source, and the camera. I(x) is the overall intensity of the illumination at point $\vec{x}$, independent of $\lambda$.

The three terms with dependence on $\lambda$ are $S(T\vec{x}, \lambda)$, the surface invariants to be determined; $E(\lambda)$, the emittance spectrum of the lights; and $F(\lambda)$, the sensitivity of the camera sensors. In general, these can be quite complex. The Maddern paper assumes that the camera sensors' sensitivity can be treated as three delta functions so that the integral above can be replaced by a sum. The paper, and some of its references, maintain that provided the width of the spectral response of the camera sensors is ≤100 nm, this assumption works well, and that if it is greater, sharpening techniques can be used to reduce the effects of a wider spread. Sharpening is not discussed in this Appendix, but those who are interested can find discussions in the other papers in the same repository as the Maddern paper. See particularly "Sharpening from shadows: Sensor transforms for removing shadows using a single image."

Making the assumption that $F(\lambda) = F(\lambda_1) + F(\lambda_2) + F(\lambda_3)$, which assumes the integrated sensor response is the same for all three and that the proportionality constant is absorbed into $I(\vec{x})$, the following equation results:

$$\overline{R}_i(\vec{x}) = G(\vec{x}) * I(\vec{x}) * S(\vec{x}) * E(\lambda_i)$$

Maddern, et al. then assume that $E(\lambda)$ is Planckian at some unknown temperature T and (see below) choose the free parameter to eliminate terms dependent on the temperature. Instead, it can be assumed that the free parameter is kept free and assumed that $E(\lambda_i)$ is known. If the log of both sides is taken, the result is:

$$Log(R_i(\vec{x})) = Log(G(\vec{x})) * I(\vec{x}) + Log(S(\vec{x})) + Log(E(\lambda_i))$$

Two directions are now presented. The first follows the paper to create a 1-D color mapping:

$$I = \log(R_2) - \alpha * \log(R_1) - (1-\alpha) * \log(R_3)$$

with $\lambda_1 < \lambda_2 < \lambda_3$.

As mentioned above, α is chosen to remove the temperature terms in $E(\lambda_i)$ that arise from assuming a Planckian distribution with unknown temperature. If that assumption is made, α=0.444 is determined for the sensors. But instead of making assumptions about the color temperature of the emitters, α can be left free. Assuming that $E(\lambda_i)$ is known, $I_\alpha$ can be calculated over the entire image and confined to the range 0-255. This becomes a new gray-scale image from which the digital fingerprint is extracted. This procedure can be carried out on any number of exposures of the relevant images, and after doing so, the digital fingerprints can be compared against all. These procedures can also be run for a range of α's and an α can be chosen that maximizes true matches across different lighting conditions of the same object for all objects. Thus, α can be chosen in this way to optimize alpha empirically across different lighting conditions.

While it may appear more direct to simply determine the $S(\vec{x}, \lambda_i)$, to a certain extent that is what the processes described herein are doing. The final equation above is a function of $R_i(\vec{x})$, but all of the components of the $R_i(\vec{x})$ have been accounted for. Therefore, I really is now just a function of $R_i(\vec{x})$.

The most curious thing about the final equation is that it doesn't treat the three sensor responses equally. Indeed, it gives the greatest importance to the middle response. This can be viewed, however, in a slightly different way. Starting against with the last equation:

$$I = \log(R_2) - \alpha * \log(R_1) - (1-\alpha) * \log(R_3)$$

$$I = (1-\alpha) * \log(R_2) + \alpha * \log(R_2) - \alpha * \log(R_1) - (1-\alpha) * \log(R_3)$$

$$I = -\alpha * \log\left(\frac{R_1}{R_2}\right) - (1-\alpha) * \log\left(\frac{R_3}{R_2}\right)$$

Here it is seen that the new 1-D "color" space I is just a function of the ratios of the longest and shortest wavelength sensor responses to the middle wavelength sensor response. If $\alpha$ were 0.5 (and it isn't all that far from it), then the two ratios are indeed treated equally. That is, the ratios of sensor responses are known to be considerably more illumination invariant than the sensor responses themselves.

This leads to a second approach to the color map; one that produces a 3D color map that is (roughly) illumination-invariant.

Second Approach. Returning to this equation:

$$\text{Log}(R_i(\vec{x})) = \text{Log}(G(\vec{x}) * I(\vec{x})) + \text{Log}(S(\vec{x}, \lambda_i)) + \text{Log}(E(\lambda_i))$$

Three equations can be formed:

$$\text{Log}(R_1(\vec{x})) = \text{Log}(G(\vec{x}) * I(\vec{x})) + \text{Log}(S(\vec{x}, \lambda_1)) + \text{Log}(E(\lambda_1))$$

$$\text{Log}(R_2(\vec{x})) = \text{Log}(G(\vec{x}) * I(\vec{x})) + \text{Log}(S(\vec{x}, \lambda_2)) + \text{Log}(E(\lambda_2))$$

$$\text{Log}(R_3(\vec{x})) = \text{Log}(G(\vec{x}) * I(\vec{x})) + \text{Log}(S(\vec{x}, \lambda_3)) + \text{Log}(E(\lambda_3))$$

Subject the second from the other two and combine:

$$\text{Log}\left(\frac{R_1}{R_2}\right) = \text{Log}\left(\frac{S_1}{S_2}\right) + \text{Log}\left(\frac{E_1}{E_2}\right) = \text{Log}\left(\frac{S_1 E_1}{S_2 E_2}\right)$$

$$\text{Log}\left(\frac{R_3}{R_2}\right) = \text{Log}\left(\frac{S_3}{S_2}\right) + \text{Log}\left(\frac{E_3}{E_2}\right) = \text{Log}\left(\frac{S_3 E_3}{S_2 E_2}\right)$$

Exponentiating both sides yields:

$$\frac{S_1}{S_2} = \frac{R_1 E_2}{R_2 E_1}$$

and $$\frac{S_3}{S_2} = \frac{R_3 E_2}{R_2 E_3}$$

These then become a 2D invariant color space. A 2D color space is not particularly useful directly for producing digital fingerprints, so the results are combined into a weighted sum:

$$J = \beta * \frac{R_1 E_2}{R_2 E_1} + (1-\beta) * \frac{R_3 E_2}{R_2 E_3}$$

The entire image is reviewed, and J is mapped linearly to the range 0-255.

In both this and the previous derivation, doubling the radiation intensity, say, has no effect on J since in the ratios (in this derivation) and in the fact that the weights sum to zero in the first derivation all the Log(2) terms go away. That is as it should be. There is, however, a problem with anything that uses color differences to create illumination invariance, and that problem is related to what happens when the object is monochromatic. When that is true, all the sensor responses are in fixed relationship to each other and both derivations give uniform results for I and J. Therefore, creating illumination invariance is next described.

Monochrome Illumination Invariance

An unfortunate characteristic of the approaches described herein is that they won't work well on objects that are roughly monochrome or with monochrome images since all values of $R_i$ are the same at a pixel. This third approach comes at the problem differently. Instead of aiming for invariance from a combination of three different images (one in each color plane) taken with the same lighting, invariance is instead sought from a combination of monochrome images taken with different lighting geometries.

The technique described here requires four or more lighting conditions. If there are exactly four, the solution will be exact; if more, the results will be a least-squares optimal solution. The derivation assumes that both the camera and the light sources are points at infinity. Both of these restrictions can be relaxed. It is assumed, however, that both are at infinity to avoid perspective problems, but the math can be altered to remove this restriction.

The point approximation is even easier to relax because all the math is linear. Just as (when more than one light is on) the effects of multiple lights are simply added together, so it is possible to integrate over a surface such as a Dracast panel.

Figure 4:
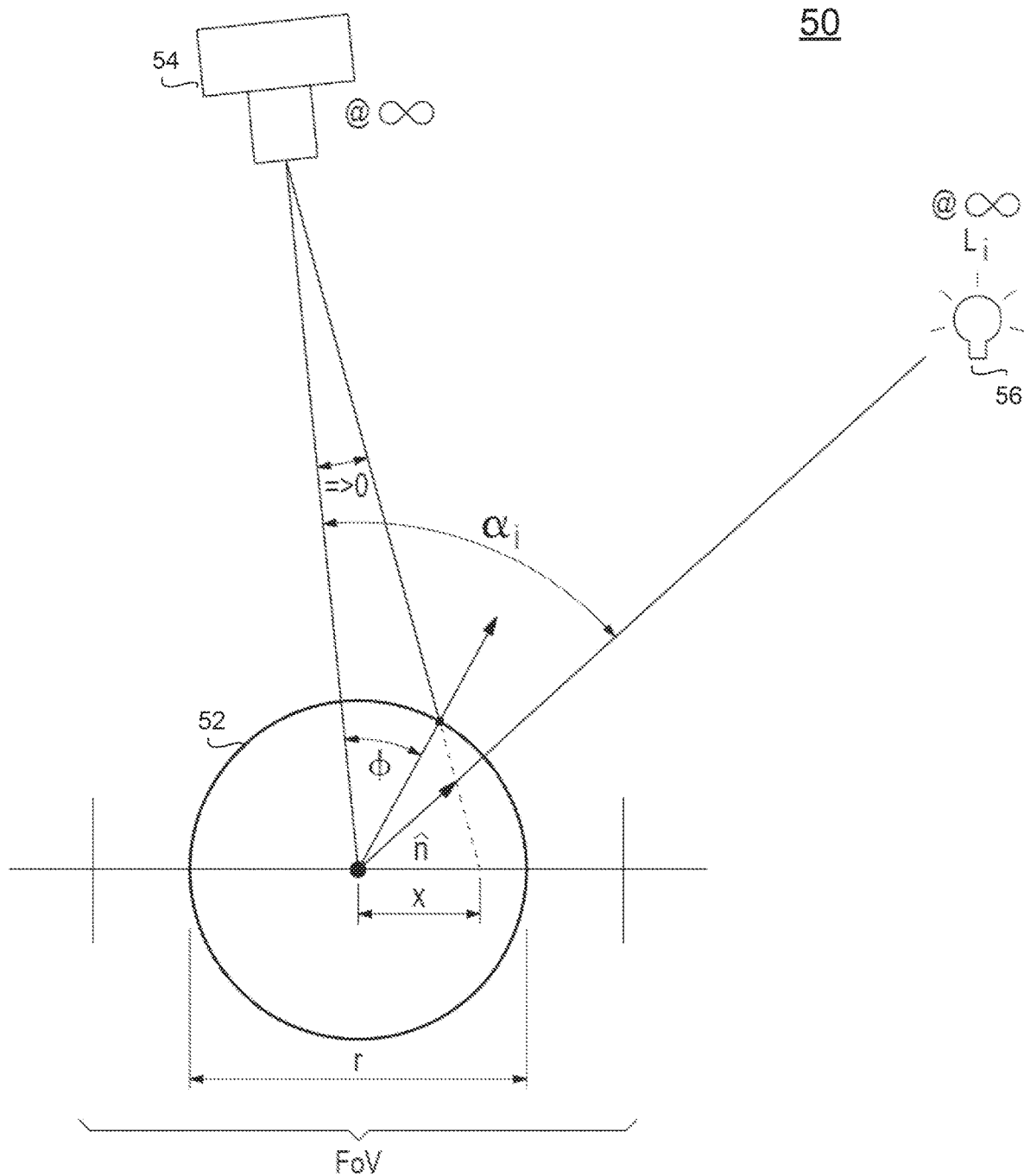
FIG. 4 is a conceptual diagram of a system for capturing an image of a rigid object.

This section will demonstrate a method that, with at least three known illumination conditions (and a few reasonable assumptions), it is possible to determine both the invariant reflectivity and the surface normal vectors at all points on the surface of an object. The technique will be shown in an example system 50 of the type shown in FIG. 4. FIG. 4 includes a sphere 52 of radius r. There is a single monochrome camera 54 located sufficiently far away from the sphere 52 as to be considered to be located at infinity. This is not a requirement, but for demonstration purposes makes the math easier.

The field of view (FoV) of the camera is shown and is big enough to show the entire object. There are N lights 56, also "located at infinity" whose designations are $L_i$. They are located at an angle $\alpha_i$ from the camera direction. $\vec{x}$ is the location of the surface point in the field of view of the camera. That vector is the projection of the surface point onto the focal plane. The surface point has a normal unit vector $\hat{n}(\vec{x})$. On the diagram it is seen that the angle subtended by $\vec{x}$ at the camera as zero, the consequence of the camera being at logical infinity.

Considering some mathematical identities.

$$\|X\| \cdot \|X(\phi)\| = r\sin\phi$$

$$\hat{a}_i = \hat{e}_1 \sin\alpha_1 + \hat{e}_2 \cos\alpha:$$

$$\hat{n} \cdot \hat{e}_1 \sin\phi + \hat{e}_2 \cos\phi$$

$$R(X) = \hat{a}_i \cdot \hat{n} \text{ Lambertian Assumption}$$

$$R(r\sin\phi) = \text{Sin}\alpha_i \text{Sin}\phi + \text{Cos}\alpha_i \cos\phi$$
$$= \text{Cos}(\phi = \alpha_i)$$

The first equation merely defines the norm of $\vec{x}$ in terms of the radius of the sphere and $\varphi(\vec{x})$, the angle between the line to the camera and the line to the surface point.

The second equation expresses the unit vector $\vec{\alpha}_I$ in terms of the coordinate system unit vectors $\vec{e}_1$ and $\vec{e}_2$ where $\vec{e}_1$ is in the direction athwart the focal plane and $\vec{e}_2$ points at the camera. As previously discussed, the $\alpha_i$ are the angles to the lights.

The third equation gives the components of the surface normal in terms of $\varphi(\vec{x})$. The fourth equation is the assumption that the surface is Lambertian and that the viewing angle has no effect on the light received from the surface. This analysis can be modified to include specular reflection and hybrids. The final equation expands this in terms of $\varphi$ and the $\alpha_i$. As should be expected with a Lambertian surface. The reflectivity is merely a function of the difference between the surface normal and the illuminant direction.

Reflecting on the process so far, it is assumed a spherical surface with uniform reflectance (assumed in the Lambertian term) not because the math requires it but so that the surface shape and reflectivity can be recovered to demonstrate the algorithm's performance. For simplicity, everything is kept in the plane of the paper. With that out of the way, the following equation is created to express the response of the camera sensor (presumed to be monochrome):

$$R_i(\vec{x}) = \hat{n}(\vec{x})^{\hat{a}_i} * E * F * S(\vec{x})$$

This is the fundamental equation from which the work begins. $R_i(\vec{x})$ is the camera sensor response to lighting configuration i at location $\vec{x}$. $\hat{n}(\vec{x})$ is the object's surface normal unit vector at that point. $\hat{a}_i$ is the unit vector in the direction of light i. $\hat{n}(\vec{x})^{\hat{a}_i}$ is the assumption of Lambertian reflectance in the surface. (If the reflectance is not Lambertian, there will be terms relating the directions of the surface normal, the direction to the light(s), and the direction to the camera.) E is the emissivity of the light, and F is the response of the camera sensor to unit illumination. Since (at least for the Dracast panels) E is constant and for a given camera F always is. Since we $R_i(\vec{x})$ will be scaled to produce a gray-scale image for digital fingerprinting, E*F to 1 can be scaled.

A somewhat condensed shorthand is used here about which caution must be exercised. i generally refers to a lighting configuration and when there is only one light operating it also refers to that particular light. Thus when one of lights $L_1$, $L_2$, $L_3$, or $L_4$ is on, it produces sensor responses $R_1$, $R_2$, $R_3$, or $R_4$. The problem comes with the configuration, $L_0$, which has all four lights on. In this case the shorthand expression $$R_4(\vec{x}) = \hat{n}(\vec{x})^{\hat{a}_i} * E * F * S(\vec{x})$$

really means $$R_4(\vec{x}) = \hat{n}(\vec{x})^{\sum_1^4 \hat{a}_i} * E * F * S(\vec{x})$$

Since the equations are linear, this should not cause a problem, provided the analysis accounts for this linearity as processing advances.

This simple equation is left:

$$R_i(\vec{x}) = \hat{n}(\vec{x})^{\hat{a}_i} * S(\vec{x})$$

Next, $\hat{n}(\vec{x}) \stackrel{\text{def}}{=} [\alpha,\beta,\gamma]$ is defined. Because $\hat{n}$ is always (by definition) a unit vector, the following normalization equation can be determined:

$$\alpha^2 + \beta^2 + \gamma^2 = 1$$

Subject to this constraint, four unknowns are associated with each point: $\alpha$, $\beta$, $\gamma$, and $S(\vec{x})$.

Also in the processing, $\hat{a}_i \stackrel{\text{def}}{=} [a_i, b_i, c_i]$ and $a_i^2 + b_i^2 + c_i^2 = 1$. In this case, all the components are known because the lights were purposely and knowingly placed. This provides a set of N+1 equations in four unknowns. The +1 comes from the requirement that the surface normal vector be a unit vector. To solve, at least three lighting configurations are needed. If more than three lighting conditions are provided, a least-squares solution, rather than an exact solution, will be derived.

The sensor response equation can be turned into a matrix equation:

$$\vec{R}(\vec{x}) = [A] \, \hat{n}(\vec{x}) * S(\vec{x})$$

Here, $$\vec{R}^T(\vec{x}) \stackrel{\text{def}}{=} [R_0(\vec{x}), R_0(\vec{x}), R_0(\vec{x}), \ldots],$$

$$[A] \stackrel{\text{def}}{=} \begin{bmatrix} a_0 & b_0 & c_0 \\ a_1 & b_1 & c_1 \\ a_2 & b_2 & c_2 \\ & \ldots & \end{bmatrix}, \text{ and } \hat{n}^T(\vec{x}) \stackrel{\text{def}}{=} [\alpha, \beta, \gamma].$$

There are three components for each lighting configuration, hence three horizontal components in [A]. $\vec{R}(\vec{x})$ and [A] have N vertical components, one for each lighting condition. In the event more than one light is on in a given lighting configuration ($L_0$), then the components may be simply added.

Solving the sensor response equation is simple. Multiply each side by $[A]^T$ from the left, then multiply each side by $[AA^T]^{-1}$ from the left. This yields:

$$\hat{n}(\vec{x}) * S(\vec{x}) = [A^T A]^{-1} A^T \vec{R}(\vec{x})$$

Note that the factor dependent on [A] need be calculated only once but everything else is calculated at each pixel including the multiplication on the right. The two components on the left of the above equation can be recovered separately by remembering that $S(\vec{x})$ is a scalar and hence forms the magnitude of the vector $\hat{n}(\vec{x}) * S(\vec{x})$ since $\hat{n}(\vec{x})$ is a unit vector.

For any Lambertian surface, and keeping in mind the concern about how multiple lights on affect things, this equation is general.

The spherical object is next addressed. As set up, $S(\vec{x})$ is uniformly=1. And also:

$$\hat{n}(\vec{x}) = \begin{pmatrix} \sin(\varphi(\vec{x})) \\ \cos(\varphi(\vec{x})) \end{pmatrix}$$

and $$\vec{R}(\vec{x}) = \begin{pmatrix} \cos(\varphi(\vec{x}) - \alpha_0) \\ \cos(\varphi(\vec{x}) - \alpha_1) \end{pmatrix}$$

Both of these were shown in the definitions above in this Appendix.

As a check on the math above, an attempt to recover these from just the locations of the lights and the sensor responses is made. In this case:

$$[A] = \begin{bmatrix} \sin(\alpha_0) & \cos(\alpha_0) \\ \sin(\alpha_1) & \cos(\alpha_1) \end{bmatrix}$$

$$[A^T A] = \begin{bmatrix} \sin^2(\alpha_0) + \sin^2(\alpha_1) & \sin(\alpha_0)\cos(\alpha_0) + \sin(\alpha_1)\cos(\alpha_1) \\ \sin(\alpha_0)\cos(\alpha_0) + \sin(\alpha_1)\cos(\alpha_1) & \cos^2(\alpha_0) + \cos^2(\alpha_1) \end{bmatrix}$$

Inverting yields:

$$[A^T A]^{-1} = \left(\frac{1}{\sin^2(\alpha_0 - \alpha_1)}\right) \begin{bmatrix} \cos^2(\alpha_0) + \cos^2(\alpha_1) & -\sin(\alpha_0)\cos(\alpha_0) - \sin(\alpha_1) + \cos(\alpha_1) \\ -\sin(\alpha_0)\cos(\alpha_0) - \sin(\alpha_1)\cos(\alpha_1) & \sin^2(\alpha_0) + \sin^2(\alpha_1) \end{bmatrix}$$

Multiplying this from the right by $[A^T]$ and cancelling and gathering terms gives:

$$[A^T A]^{-1}[A^T] = \left(\frac{1}{\sin^2(\alpha_0 - \alpha_1)}\right) \begin{bmatrix} \cos(\alpha_1) & -\cos(\alpha_0) \\ -\sin(\alpha_1) & \sin(\alpha_0) \end{bmatrix} *$$

$$(\sin(\alpha_0)\cos(\alpha_1) - \sin(\alpha_1)\cos(\alpha_0))$$

Now since the final term = $\sin(\alpha_0 - \alpha_1)$, the following is determined:

$$\hat{n}(\vec{x}) * S(\vec{x}) = \left(\frac{1}{\sin(\alpha_0 - \alpha_1)}\right) \begin{bmatrix} \cos(\alpha_1) & -\cos(\alpha_0) \\ -\sin(\alpha_1) & \sin(\alpha_0) \end{bmatrix} \vec{R}(\vec{x})$$

Inserting $$\vec{R}(\vec{x}) = \begin{pmatrix} \cos(\varphi(\vec{x}) - \alpha_0) \\ \cos(\varphi(\vec{x}) - \alpha_1) \end{pmatrix}$$

into this and multiplying yields:

$$\hat{n}(\vec{x}) * S(\vec{x}) =$$

$$\left(\frac{1}{\sin(\alpha_0 - \alpha_1)}\right) \begin{bmatrix} \cos(\alpha_1)\cos(\varphi(\vec{x}) - \alpha_0) - \cos(\alpha_0)\cos(\varphi(\vec{x}) - \alpha_1) \\ -\sin(\alpha_1)\cos(\varphi(\vec{x}) - \alpha_0) + \sin(\alpha_0)\cos(\varphi(\vec{x}) - \alpha_1) \end{bmatrix}$$

Gathering terms changes the term in [ ] to:

$$\begin{bmatrix} \sin(\alpha_0 - \alpha_1) * \sin(\varphi(\vec{x})) \\ \sin(\alpha_0 - \alpha_1) * \cos(\varphi(\vec{x})) \end{bmatrix}$$

Cancelling terms yields:

$$\hat{n}(\vec{x}) * S(\vec{x}) = \begin{bmatrix} \sin(\varphi(\vec{x})) \\ \cos(\varphi(\vec{x})) \end{bmatrix}$$

Since the vector on the right is a unit vector, the following is left:

$$\hat{n}(\vec{x}) = \begin{bmatrix} \sin(\varphi(\vec{x})) \\ \cos(\varphi(\vec{x})) \end{bmatrix}$$

and $$S(\vec{x}) = 1$$

thus recovering the properties of the sphere and showing the math works.

At least some of the equipment discussed in the present disclosure comprises hardware and associated software. For example, the typical electronic device is likely to include one or more processors and software executable on those processors to carry out the operations described. The term software is used herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present disclosure may include executable programs or instructions that are stored in machine-readable or computer-readable storage media, such as a digital memory. No implication is made that a "computer" in the conventional sense is required in any particular embodiment. For example, various processors, embedded or otherwise, may be used in equipment such as the components described herein.

Memory for storing software is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized herein, may be used to make a software product. That said, it is also known that software can be distributed via electronic transmission ("download"), in which case there typically will be a corresponding software product at the transmitting end of the transmission, or the receiving end, or both.

Having described and illustrated the principles of the disclosure in a preferred embodiment thereof, it should be apparent that the disclosure may be modified in arrangement and detail without departing from such principles. All modifications and variations coming within the spirit and scope of the following claims are reserved.

The invention claimed is:

1. A digital fingerprinting method, comprising:
   acquiring first image data of a portion of a surface of a first physical object;
   constructing a first model of the portion of the surface of the first physical object from the first image data, wherein the first model includes a plurality of surface features of the portion of the surface of the first physical object;
   extracting a selection of surface features from the plurality of surface features included in the first model based on one or more authentication regions specified for a class of physical objects to which the first physical object belongs, each of the one or more authentication regions corresponding to a respective sub-region;
   determining a first digital fingerprint based on the selection of surface features, wherein the first digital fingerprint uniquely identifies the first physical object from other physical objects in the class of physical objects to which the first physical object belongs; and
   inducting the first physical object into a reference database system by storing a record in the reference database system that includes the first digital fingerprint of the first model that uniquely identifies the first physical object from other physical objects in the class of physical objects to which the first physical object belongs.

2. The method of claim 1, wherein the first model is based on native properties of the first physical object without recognizing identifying content attached to the first physical object.

3. The method of claim 1, further comprising:
   scanning a second physical object to capture second image data of a portion of a surface of the second physical object;
   constructing a second model of the portion of the surface of the second physical object from the second image data, the second model based on native properties of the second physical object, without recognizing identifying content attached to the second physical object;
   extracting a second digital fingerprint based on the second model based on one or more authentication regions specified for the class of physical objects to which the first and the second physical objects belong;
   comparing the second digital fingerprint to the characterizing first digital fingerprint to attempt to authenticate the second physical object as being the first physical object; and
   generating a report based on the comparing.

4. The method of claim 1, further comprising:
   scanning a second physical object to capture second image data of the second physical object;
   extracting a third digital fingerprint from the second image data based on one or more authentication regions specified for the class of physical objects to which the first and the second physical objects belong, the third digital fingerprint based on native properties of the second physical object without recognizing identifying content attached to the second physical object;
   comparing the third digital fingerprint to the first digital fingerprint to obtain a result; and
   generating a report based on the comparing.

5. The method of claim 1, further comprising:
   querying a reference database system based on at least one digital fingerprint.

6. The method of claim 1, further comprising:
   acquiring additional image data from a plurality of images of the portion of the first physical object; and
   constructing the first model of the first physical object based on the first image data and the additional image data.

7. The method of claim 1 wherein the first model is substantially invariant to changes in at least one selected condition from among a set of conditions that includes: Scale, Rotation, Affine, Homography, Perspective, and Illumination.

8. The method of claim 1, wherein constructing a first model of the portion of the surface of the first physical object from the first image data comprises:
   creating a three-dimensional map of the portion of the surface of the first physical object; and
   converting the three-dimensional map into a digital representation of the portion of the surface.

9. The method of claim 1, further comprising:
   detecting a plurality of points of interest on the portion of the surface of the first physical object represented in the first model;
   characterizing each point of interest by a respective feature vector; and
   augmenting each feature vector with at least one of three-dimensional coordinates of the respective point of interest on the portion of the surface, a surface shape characteristic, chroma, and reflectance.

10. The method of claim 1, further comprising:
    identifying a plurality of points of interest on the portion of the surface of the first physical object; and
    producing an n-dimensional model of the first physical object, wherein each of the identified plurality of points of interest is characterized by an n-dimensional vector.

11. The method of claim 10 wherein producing an n-dimensional model of the first physical object comprises producing the n-dimensional vector associated with a plurality of parameters including at least one of: an (x, y, z) location of the corresponding identified point of interest on the portion of the surface of the first physical object, a surface shape characteristic, chroma, and reflectance.

12. The method of claim 1, wherein determining a first digital fingerprint based on the selection of surface features comprises:
    generating a digital fingerprint of the first physical object based on the digital representation, without reference to any image of the first physical object.

13. The method of claim 1, wherein inducting the first physical object into a reference database system comprises:
    storing the digital fingerprint for at least one of subsequent authentication, tracking, and identification.

14. The method of claim 1, wherein extracting a selection of surface features from the plurality of surface features included in the first model based on one or more authentication regions specified for a class of physical objects to which the first physical object belongs, comprises extracting the selection of surface features for one respective sub-region.

15. The method of claim 1, wherein extracting a selection of surface features from the plurality of surface features included in the first model based on one or more authentication regions specified for a class of physical objects to which the first physical object belongs, comprises extracting the selection of surface features for two or more respective sub-regions.

16. The method of claim 1, wherein extracting a selection of surface features from the plurality of surface features included in the first model based on one or more authentication regions specified for a class of physical objects to which the first physical object belongs, comprises extracting the selection of surface features for two or more respective sub-regions but less than all sub-regions.

\* \* \* \* \*